US 11,268,806 B2

(12) United States Patent
Fertig et al.

(10) Patent No.: US 11,268,806 B2
(45) Date of Patent: Mar. 8, 2022

(54) DYNAMICAL LOCKING OF OPTICAL PATH TIMES USING ENTANGLED PHOTONS

(71) Applicant: Honeywell International Inc., Morris Plains, NJ (US)

(72) Inventors: Chad Fertig, Bloomington, MN (US); David Campagna, Westminster, CO (US); Karl D. Nelson, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/936,282

(22) Filed: Jul. 22, 2020

(65) Prior Publication Data

US 2022/0026195 A1 Jan. 27, 2022

(51) Int. Cl.
| | |
|---|---|
| *G01B 11/14* | (2006.01) |
| *H04B 10/29* | (2013.01) |
| *H04B 10/50* | (2013.01) |

(52) U.S. Cl.
CPC ............. *G01B 11/14* (2013.01); *H04B 10/29* (2013.01); *H04B 10/503* (2013.01); *G01B 2290/40* (2013.01); *G01B 2290/55* (2013.01)

(58) Field of Classification Search
CPC .. G01B 9/02; G01B 9/02007; G01B 9/02027; G01B 11/14; G01B 2290/40; G01B 2290/55; H04B 10/29; H04B 10/503
See application file for complete search history.

(56) References Cited

U.S. PATENT DOCUMENTS

| | | | |
|---|---|---|---|
| 4,004,098 A | 1/1977 | Shimasaki | |
| 5,475,520 A | 12/1995 | Wissinger | |

(Continued)

FOREIGN PATENT DOCUMENTS

| | | | |
|---|---|---|---|
| CN | 104407321 A | * | 3/2015 |
| CN | 106848827 A | | 6/2017 |

(Continued)

OTHER PUBLICATIONS

Fertig, Chad et al. "Integrated Photonics Source and Detector of Entangled Photons", U.S. Appl. No. 16/803,841, filed Feb. 27, 2020, pp. 1-34, Published: US.

(Continued)

*Primary Examiner* — Michael A Lyons
(74) *Attorney, Agent, or Firm* — Fogg & Powers LLC

(57) ABSTRACT

Systems and methods for dynamic locking of optical path times using entangled photons are provided. A system includes an optical source for generating bi-photons; tracer laser beam sources for generating tracer laser beams; telescopes that emit the tracer laser beams and the bi-photons to remote reflectors, each bi-photon traveling along an optical path in a pair of optical paths toward a corresponding remote reflector, wherein the telescopes receive reflected bi-photons from the remote reflectors; and communication links, wherein the optical source respectively communicates with first and second remote reflectors through a first and second communication link. Also, the optical source uses the tracer laser beams and the communication links to respectively point the bi-photons towards the remote reflectors. Moreover, the system includes an interferometer that provides information regarding detection of the reflected bi-photons, wherein the optical source uses the information to adjust optical path lengths to be substantially equal.

20 Claims, 9 Drawing Sheets

(56) References Cited

U.S. PATENT DOCUMENTS

| | | | |
|---|---|---|---|
| 6,590,685 | B1 | 7/2003 | Mendenhall et al. |
| 7,286,444 | B1 | 10/2007 | Bahder et al. |
| 7,324,211 | B2* | 1/2008 | Tsujita ............... A61B 1/00096 |
| | | | 356/479 |
| 7,359,064 | B1 | 4/2008 | Bahder |
| 9,784,561 | B2* | 10/2017 | Jiang ................. G01B 9/02004 |
| 10,187,162 | B2 | 1/2019 | Li et al. |
| 2005/0199812 | A1 | 9/2005 | Shih |
| 2009/0134310 | A1 | 5/2009 | Goodno |
| 2009/0290162 | A1 | 11/2009 | Erkmen et al. |
| 2010/0123091 | A1* | 5/2010 | Gilbert ..................... G01S 7/484 |
| | | | 250/493.1 |
| 2013/0176573 | A1 | 7/2013 | Bovino |
| 2015/0077734 | A1 | 3/2015 | Habif |
| 2019/0349094 | A1* | 11/2019 | Santra ................... H04B 10/70 |
| 2020/0382219 | A1 | 12/2020 | Innes et al. |

FOREIGN PATENT DOCUMENTS

| | | |
|---|---|---|
| CN | 109547144 A | 3/2019 |
| CN | 109586907 A | 4/2019 |
| CN | 209170391 U | 7/2019 |
| WO | 2020140850 A1 | 7/2020 |

OTHER PUBLICATIONS

Hayat et al., "Theory of photon coincidence statistics in photon-correlated beams", Optics Communications 6067, Jul. 9, 1999, pp. 1-13, Elsevier Science B.V.

Puckett, Matthew W. et al. "Integrated Photonics Mode Splitter and Converter", U.S. Appl. No. 16/803,820, filed Feb. 27, 2020, pp. 1-31, Published: US.

Puckett, Matthew W. et al. "Integrated Photonics Vertical Coupler", U.S. Appl. No. 16/803,831, filed Feb. 27, 2020, pp. 1-31, Published: US.

Kim et al., "Two-photon interference of polarization-entangled photons in a Franson interferometer", Scientific Reports, 7, 5772, Jul. 18, 2007, pp. 1 through 13.

Lyons et al., "Attosecond-resolution Hong-Ou-Mandel interferometry", Scientific Advances, 2018:4, May 4, 2018, pp. 1 through 8, Optics.

U.S. Patent and Trademark Office, "Office Action", U.S. Appl. No. 16/936,294, filed Jun. 23, 2021, pp. 1 through 23, Published: US.

Aguilar et al., "Robust interferometric sensing using two-photon interference", Jul. 10, 2020, pp. 1 through 10.

European Patent Office, "Extended European Search Report from EP Application No. 21172506.4", from Foreign Counterpart to U.S. Appl. No. 16/936,294, dated Sep. 27, 2021, pp. 1 through 8, Published: EP.

Quan et al "Demonstration of quantum synchronization based on second-order quantum coherence of entangled photons", Scientific Reports, Jul. 25, 2016, pp. 1 through 8, www.nature.com/scientificreports.

Valencia et al "Distant clock synchronization using entangled photon pairs", Applied Physics Letters, Sep. 27, 2004, pp. 2655 through 2657, vol. 85, No. 13, American Institute of Physics.

European Patent Office, "Extended European Search Report from EP Application No. 21172509.8", from Foreign Counterpart to U.S. Appl. No. 16/936,295, dated Sep. 28, 2021, pp. 1 through 8, Published: EP.

Fertig Chad et al., "Dynamic Optical Interferometer Locking Using Entangled Photons", U.S. Appl. No. 16/936,294, filed Jul. 22, 2020, pp. 1 through 43, Published: US.

Fertig, Chad et al., "Direct Measurement of Imbalanced Optical Paths Using Entangled Photons", U.S. Appl. No. 16/936,295, filed Jul. 22, 2020, pp. 1 through 37, Published: US.

U.S. Patent and Trademark Office, "Office Action", U.S. Appl. No. 16/936,295, filed Oct. 14, 2021, pp. 1 through 24, Published: US.

U.S. Patent and Trademark Office, "Notice of Allowance", U.S. Appl. No. 16/936,294, filed Oct. 22, 2021, pp. 1 through 12, Published: US.

* cited by examiner

DYNAMICAL LOCKING OF OPTICAL PATH TIMES USING ENTANGLED PHOTONS

BACKGROUND

As satellites orbit the earth, they may communicate with one another to synchronize the clocks onboard the different satellites. Frequently, to precisely synchronize clocks, satellites use interferometric methods to establish the relative separations of the satellites. When satellites know the relative separation to neighboring satellites, they can transmit to and receive information from neighboring satellites that include accurate time and frequency information acquired from atomic clocks. The atomic clocks are used for the distribution of international time, to control the frequencies of broadcasted signals, and in global navigation satellite systems (GNSS) such as the global positioning system (GPS), GLONASS, BeiDou, or Galileo.

SUMMARY

Systems and methods for dynamic locking of optical path times using entangled photons are provided. In certain embodiments, a system includes an optical source for generating pairs of bi-photons. The system also includes a plurality of tracer laser beam sources for generating a plurality of tracer laser beams. Further, the system includes a plurality of telescopes that emit the plurality of tracer laser beams and the pairs of bi-photons to a pair of remote reflectors, each bi-photon in the pairs of bi-photons traveling along an optical path in a pair of optical paths toward a corresponding remote reflector in the pair of remote reflectors, wherein the plurality of telescopes receive reflected bi-photons from the pair of remote reflectors. Additionally, the system includes a plurality of communication links, wherein the optical source communicates with a first remote reflector in the pair of remote reflectors through a first communication link in the plurality of communication links and with a second remote reflector in the pair of remote reflectors through a second communication link in the plurality of communication links. The optical source uses the plurality of tracer laser beams and the plurality of communication links to respectively point the pairs of bi-photons towards the pair of remote reflectors. Moreover, the system includes an interferometer that provides information regarding detection of the reflected bi-photons, wherein the optical source adjusts lengths of the pair of optical paths to be substantially equal based on the provided information.

DRAWINGS

Understanding that the drawings depict only some embodiments and are not, therefore, to be considered limiting in scope, the exemplary embodiments will be described with additional specificity and detail using the accompanying drawings, in which.

Figure 1:
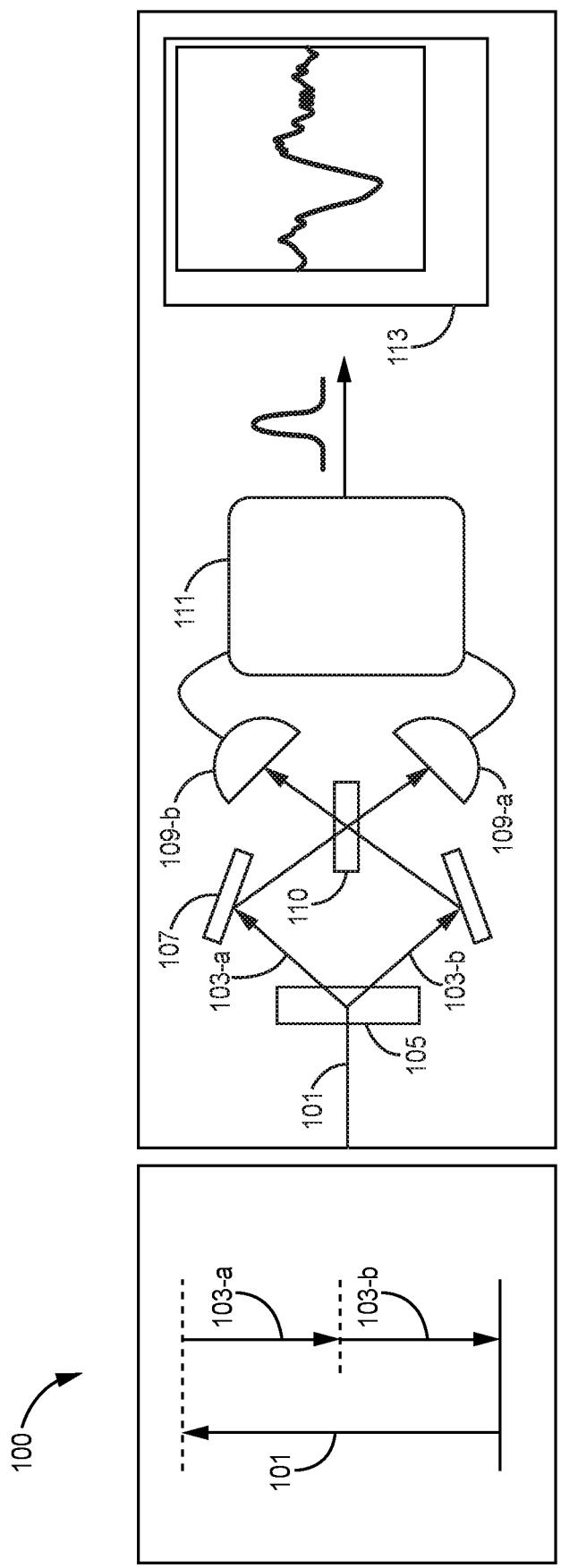
FIG. 1 is a diagram illustrating an exemplary interferometer according to an aspect of the present disclosure.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made.

The present disclosure describes methods and systems for performing dynamic locking of optical path times using entangled photons. Systems and methods may use time entangled photons and Hong-Ou-Mandel (HOM) interferometry to generate high precision timing signatures for establishing truly simultaneous optical paths, in the sense of equal times of flight for light pulses, between remote, and potentially moving, bodies. An optical source may generate a photon that is split into two quantum mechanically entangled bi-photons that are created at nearly the same instant in time. An optical source body, such as a source satellite, may send the bi-photons to two remote bodies, such as two satellites, to effect a real-time lock of the optical path lengths between the source body and the two remote bodies, such that the separate optical path lengths between the source and each remote body are substantially equal. The remote bodies may reflect a portion of the received bi-photons towards the source satellite. The source satellite may recombine the reflected bi-photons within a HOM interferometer. When configured appropriately, a system may observe a dip in the number of coincident photon detections amongst a plurality of photon detectors when the optical path lengths are substantially equal. Based on the observation of the dip, the system may use quantum mechanical entanglement between the bi-photons to determine that two optical path lengths are practically equal.

Systems may also perform optical pointing before the locking of optical path lengths. For example, a source satellite may transmit a tracer laser beam composed of classical photons, along substantially the same optical path as the entangled bi-photons, to aid a pointing subsystem in the capture and stabilization of an optical link between the source body and the remote bodies. The remote bodies and source body may have steerable optics that work in concert with one another to maintain the desired pointing of the source satellites toward the remote bodies. In particular, the remote bodies may use partially transmissive optics to partially detect and partially reflect the tracer laser beam. The remote bodies may use the detected portion of the tracer beam to perform steering and provide steering feedback to the source satellite through a communication link. The remote bodies reflect the reflected portion of the tracer beam to the source satellite, where the source satellite uses the reflected tracer beam to provide steering feedback to the remote bodies.

In some embodiments, the initial difference of the optical paths between the separate remote bodies and the source body may be substantial (>10 km). When the paths are substantially different, the system may make a series of path length changes such that bi-photons emitted from the source body and reflected by the remote bodies towards the source body arrive at the source body at substantially the same time (a difference between arrival times <100 femtoseconds, for example). Initially, the source body or remote bodies may acquire telemetry information from ground stations that provide a rough estimate of the initial difference in optical path lengths. The source and remote bodies may use the initial optical path length differences to calculate an estimate of a length of optical fiber for insertion into the shorter of the optical paths, where the length of optical fiber is roughly equivalent to the optical path length difference. Accordingly, the optical path lengths may be roughly equivalent after the insertion of the fiber.

After the insertion of a length of optical fiber into the shorter of the optical paths, the optical paths may still have a path length difference that is outside the ability of the system to make fine adjustments to the optical paths to affect the real-time lock described above and below. The system may further make adjustments to the path length difference to bring the path length difference within a fine adjustment range. In some embodiments, the system may perform a direct measurement of the optical path length difference using the difference of arrival times between bi-photons. The system may use the measured optical path length difference to adjust the path length such that the optical path length difference is within a fine adjustment range. When the optical path length is within a fine range adjustment, the system may direct a mechanical translation stage to make continuous (non-discrete) fine adjustments to the optical path lengths until observation of the HOM dip. The system determines that the optical path lengths are substantially equal upon observation of the HOM dip. Once the paths are substantially equal, the system may dynamically adjust the optical path lengths in response to detected changes in the path lengths.

In some embodiments, the system may continuously dither the optical path length of one optical path to create an error signal suitable for dynamic feedback of the optical paths such that the optical path difference has zero mean value. In other embodiments, the system may lock the optical path to a small but non-zero mean value, which value may be subsequently accounted for by processing capabilities of the system.

The above approach may enable the synchronization of satellite clocks at the femtosecond level. Such synchronization may enable multiple new capabilities based on the coherent combination of distributed radio or optical apertures. For example, new capabilities may include real-time computational interferometry for increased sensitivity to weak signals, active beam forming radar/imaging for increased covertness, reductions in both signal spillover and time on target, and other new capabilities. The methods and systems described herein are improvements over systems that use interferometric methods to establish the relative location of the communicating platforms but cannot dynamically maintain the optical path lengths.

FIG. 1 is a diagram illustrating a system 100 for a Hong-Ou-Mandel (HOM) interferometer. Systems described herein (like the system 100) may incorporate a HOM interferometer. As used herein, a HOM interferometer is a device that uses the HOM effect to measure characteristics for two received photons. The HOM interferometer may provide information that can be used to balance optical paths. The system 100 may produce a pump photon 101. The system 100 may split the pump photon 101 into two bi-photons 103 (referred to separately herein as first bi-photon 103-A and second bi-photon 103-B). For example, the pump photon 101 may be produced by a laser source that produces photons having wavelengths of 405 nm.

In certain embodiments, the pump photon 101 is split into bi-photons 103 that are guided through optical structures for recombination. For example, the pump photon 101 is split by the optical structure 105 into bi-photons 103-a and 103-b. The bi-photons 103-a and 103-b may have a wavelength that is twice the wavelength of the pump photon 101 (i.e., the pump photon 101 could have a wavelength of 405 nm, the bi-photons 103-a and 103-b may have a wavelength of 810 nm). Additionally, the system 100 may include guiding optics 107 that direct the bi-photons 103-a and 103-b to the detectors 109-a and 109-b. For example, a detector 109-a may receive and detect the bi-photon 103-a, and the detector 109-b may receive and detect the bi-photon 103-b.

In some embodiments, when the detectors 109-a and 109-b receive the associated bi-photons 103, the detectors 109-a and 109-b may provide the signals to a timing module 111, where the timing module 111 compares the times of arrival of the electrical signals, to determine the degree of coincidence of arrival. The timing module 111 may attempt to identify a delay where the coincidence rate of the signals provided by the photodetectors 109-a and 109-b dips towards zero. For example, the coincidence rate of the signals provided by the photodetectors 109-a and 109-b may drop towards zero when the bi-photons 103 overlap substantially perfectly in time. This drop towards zero is known as the HOM dip illustrated in the trace graph 113. The dip occurs when the two bi-photons 103 are substantially identical and recombine at the splitter 110. When the photons become distinguishable, the HOM dip disappears.

As described above and in further detail below, larger systems and networks may use the system 100 to synchronize atomic clocks. For example, HOM interferometry may provide a femtosecond-precise time base distributed securely across a constellation of LEO or MEO satellites. One advantage of the systems and devices disclosed herein is the use of arrays of phase synchronized receivers. Phase synchronized receivers distributed over a large area may improve the resolution of images acquired by the satellites by creating a large aperture out of the dispersed collection of smaller apertures, thereby beating the diffraction limit of the individual smaller apertures. The ultra-high-resolution imaging could support various missions ranging from sparse aperture imaging to geolocation to ground moving target indication. An additional advantage of the system 100 includes real-time computational interferometry. For example, return signals may be synthesized during acquisition and can achieve a better signal-to-noise ratio on images than can post-collection averaging.

Further advantages provided by implementing the system 100 may include active beamforming to concentrate the power of a pulse into an area smaller than could be achieved with the angular resolution of a single satellite's antenna.

Active beamforming would boost the signal-to-noise ratio of the returned signals and reduce signal spillover and time-on-target, thus increasing the covertness of implementing processes. Also, arrays of receivers are more resilient to single-point attacks and permit configuration and optimization for different, specific mission profiles.

As described above, the identification of a HOM dip and synchronization of different satellites using HOM interferometry has many different applications. However, these applications may depend on balancing the different optical paths of the interferometer within the sub-millimeter scale. Balancing the different optical paths of remotely located satellites to high levels of precision may be difficult. Systems and methods described herein implement both coarse and fine adjustments to the optical paths between the different satellites (or other remotely located devices) to balance optical paths within the sub-millimeter level.

Figure 2:
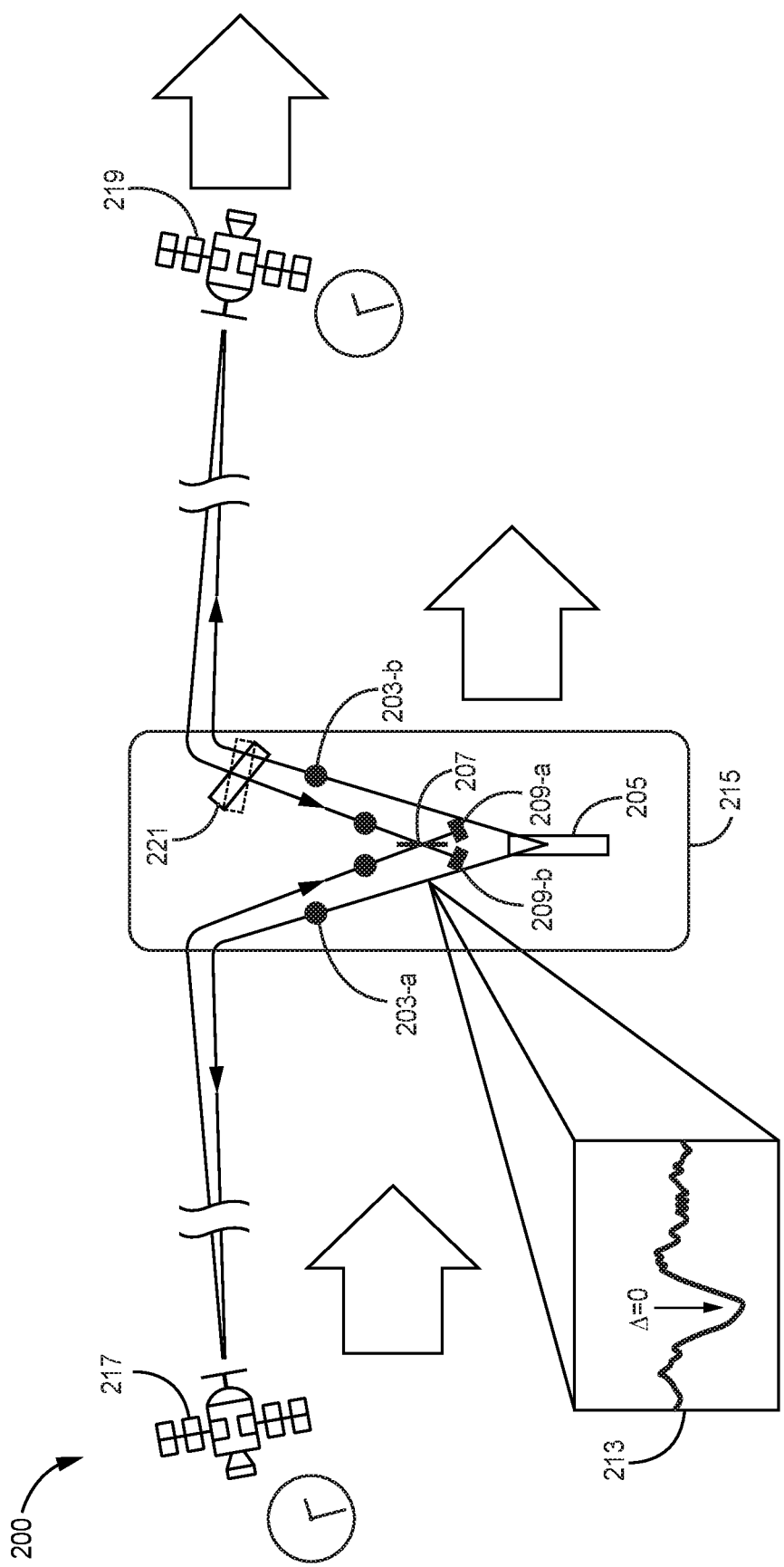
FIG. 2 is a diagram illustrating the use of interferometry within satellite communications according to an aspect of the present disclosure.

FIG. 2 is a diagram of a network 200 of multiple satellites communicating with one another. At least one of the satellites uses interferometry to determine whether the optical path lengths between it and the other satellites are equal. As shown, the network 200 may include a source satellite 215 and two remote satellites 217 and 219. The source satellite 215 may include a bi-photon pair source 205, which generates time correlated or time entangled photon pairs using spontaneous parametric down-conversion (SPDC) or other similar methods. The bi-photon pair source 205 may emit the bi-photons into separate optical paths 203-a and 203-b.

In certain embodiments, the source satellite 215 may send each photon of a bi-photon pair state to different remote satellites 217 and 219. For example, the source satellite 215 may transmit a first photon of a bi-photon pair state along the first optical path 203-a to a first remote satellite 217 and a second photon of a bi-photon pair state along the second optical path 203-b to a second remote satellite 219. Each of the remote satellites 217 and 219 may reflect the received bi-photons back to the source satellite 215. When the source satellite 215 receives the reflected photons, the source satellite 215 may combine the received photons in a 2×2 mode combiner 207. The two output ports of the 2×2 mode combiner 207 may be directed to associated photodetectors 209-a and 209-b.

As shown in the graph 213, when differences between arrival times of the received photons at the respective photodetectors 209-a and 209-b are equal to zero, the coincidence rate of the signals provided by the photodetectors 209-a and 209-b may drop towards zero as described above in connection with FIG. 1. Accordingly, when the arrival times are substantially the same for the received photons, the lengths of the optical paths 203-a and 203-b may also be substantially equal. When the optical paths 203-a and 203-b are substantially equal, the source satellite 215 may communicate with the remote satellites 217 and 219 to synchronize the clocks between the source satellite 215 and the remote satellites 217 and 219. In some embodiments, the source satellite 215 and the remote satellites 217 and 219 may be moving relative to one another during the time in which clock synchronization takes place.

In certain embodiments, the source satellite 215 and the remote satellites 217 and 219 may include various systems and methods for dynamically changing the lengths of the optical paths 203-a and 203-b to be substantially equal. For example, the source satellite 215 may include a path length alteration mechanism 221 on one or both of the optical paths 203-a and 203-b. For example, source satellite 215 may determine that the length of the optical path 203-a is shorter than the length of the optical path 203-b. Thus, the source satellite 215 may control the path length alteration mechanism 221 to change the length of the optical path 203-a such that the optical paths 203-a and 203-b are substantially equal such that the coincidence rates of detected bi-photons move towards zero.

Figure 3:
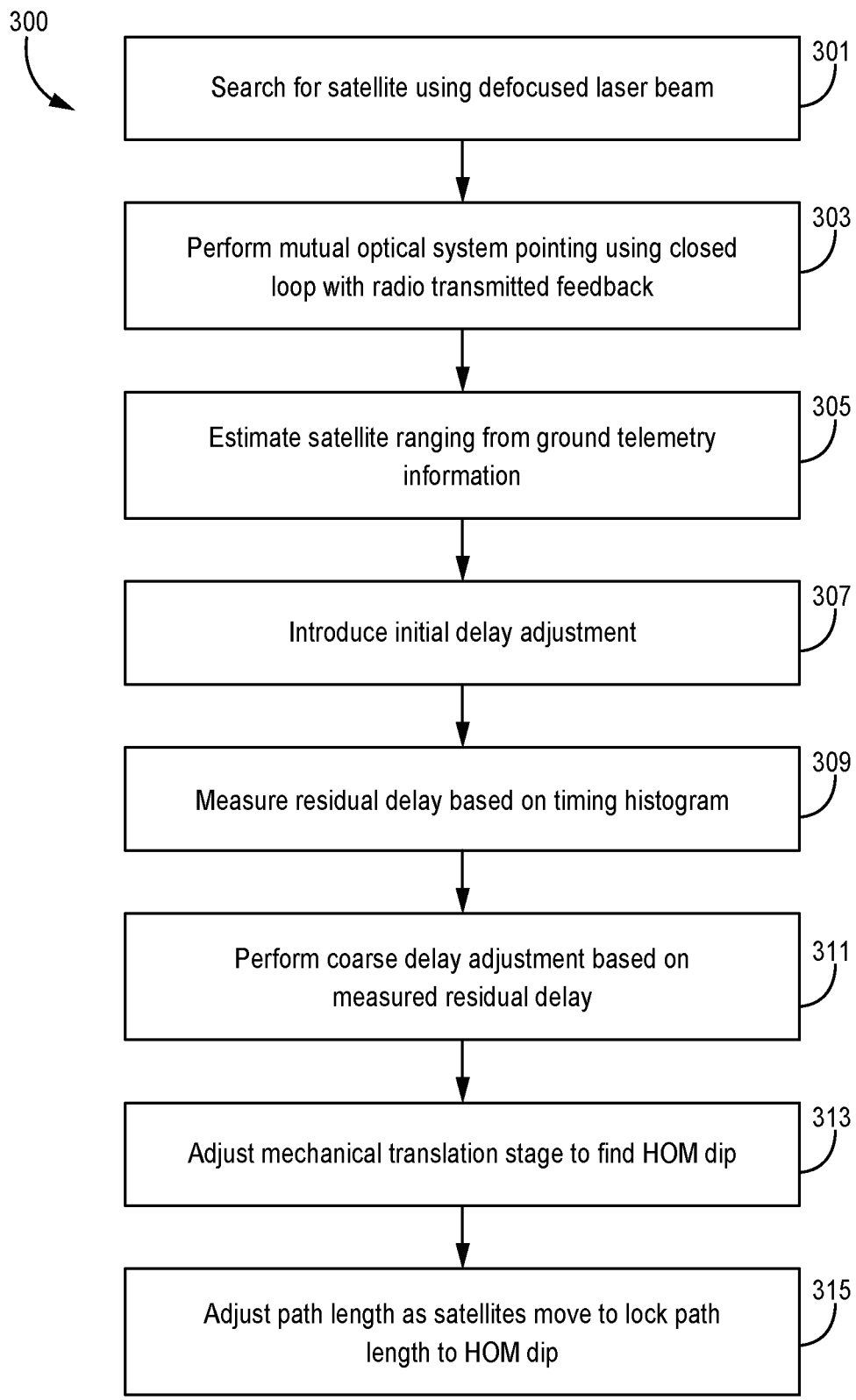
FIG. 3 is a flowchart diagram illustrating an exemplary method for dynamically locking optical path times between moving bodies using entangled photons according to an aspect of the present disclosure.

FIG. 3 is a flowchart diagram of a method 300 for dynamically locking optical path times for moving satellites using entangled photons. While the method 300 applies to satellites, systems executing the method 300 may dynamically lock optical path times between other moving and stationary bodies. The method 300 proceeds at 301, where a satellite is searched for using a defocused laser beam. For example, a source satellite (like the source satellite 215) may transmit defocused laser beams at expected locations for separate remote satellites (like the remote satellites 217 and 219). The source satellite may use telemetry information acquired from other communication systems, historical data, and the like to determine the expected location.

Additionally, the method 300 may proceed at 303, where mutual optical system pointing is performed using a closed loop with radio transmitted feedback. For example, the source satellite may form a wireless communication link with an intended remote satellite. When the remote satellite detects the defocused beam transmitted from the source satellite, the remote satellite may transmit a signal back to the source satellite over the communication link indicating that the remote satellite is receiving the defocused laser beam. When the source satellite receives the indication from the remote satellite, the source satellite may alternatingly begin incremental focusing of the laser beam and searching for the remote satellite within progressively smaller coverage areas using radio transmitted feedback received from the remote satellite. The source satellite may perform the laser beam focusing until the source satellite is emitting a collimated laser beam towards the remote satellite. Additionally, the remote satellite may also send a defocused laser beam towards the source satellite and progressively focus the beam until the source satellite receives a collimated laser beam from the remote satellite.

Further, the method 300 may proceed at 305, where satellite ranging is estimated from ground telemetry information. For example, to acquire an initial estimate of satellite locations, the source satellite (and the remote satellites) may communicate with a ground communication system, requesting telemetry information regarding the position of the remote satellite relative to the source satellite. Using the acquired telemetry information, computational devices on the source satellite may estimate satellite ranging information between the source satellite and two or more remote satellites currently in communication with the source satellite.

Also, the method 300 may proceed at 307, where an initial delay adjustment may be introduced. For example, based on the satellite ranging estimate for the source satellite and multiple remote satellites, the source satellite (and/or remote satellites) may introduce a delay into one or more of the optical paths between the source satellite and remote satellites in optical communication with the source satellite. As described above in connection with FIG. 2, the source satellites may be emitting one photon of a bi-photon pair along a first optical path towards a first remote satellite and a second photon of a bi-photon pair state along a second optical path towards a second remote satellite. The source satellite may determine that the first optical path is longer than the second optical path. Accordingly, the source satellite may increase the length of the second optical path. In some instances, to increase the length of the second optical path, the source satellite may insert a length of optical fiber into the second optical path, where the length is substantially equal to the difference between the optical path lengths as calculated from the telemetry information.

In some embodiments, the initial delay adjustment may not be precise enough to remove the difference in path length to cause the interferometer on the source satellite to observe a HOM dip. For example, the telemetry information received from ground communication systems may not be sufficiently accurate, or the size of the initial delay adjustment may call for methods that lack sufficient precision to lead to observations of the HOM dip, among other factors. The method 300 may account for the lack of precision in the initial delay adjustment by proceeding at 309, where a residual delay is measured based on a timing histogram. For example, delays between the remote satellites and the source satellites may largely be unknown. Similarly, differences between the lengths of the optical paths between the source satellite and the remote satellites may be similarly unknown. A system may account for the delays by monitoring a continuously acquired stream of time-tagged photon detections to directly measure optical path length differences through analysis of time-delay histograms for two detectors of an interferometer on the source satellite.

When the residual delay is measured, the method 300 may proceed at 311, where a coarse delay adjustment is performed based on a measured residual delay. For example, after measuring the path differences in flight times based on the time delay histograms, a system on the source satellite may make a coarse delay adjustment that is substantially equal to the observed difference in one of the two optical paths between the source satellite and the remote satellites. After adding the delay adjustment, the system may determine if the difference in path lengths increased. If the path length increased, the system may remove the inserted delay adjustment and insert the adjustment into the other optical path.

When a system makes the coarse delay adjustment, the remaining difference between optical paths may be sufficiently small, so the system can make a fine adjustment to find a HOM dip. Accordingly, the method 300 proceeds at 313, where a mechanical translation stage is adjusted to find the HOM dip. For example, a system on the source satellite may control a mechanical translation stage, which moves an optical element that is part of one of the optical paths. The mechanical translation stage may allow fine control of the rate of coincident detections and the synchronization of the optical path lengths between the source satellite and the two remote satellites such that the measured rate of coincident detections substantially vanishes, causing an observed HOM dip.

After observing the HOM dip, the method 300 may proceed at 315, where the path lengths are adjusted as the satellites move, to maintain the substantially equal optical path lengths, by maintaining the observation of the HOM dip. For example, the system on the source satellite and remote satellites may make adjustments as situations arise using any combination of coarse delay adjustments and adjustments to the mechanical translation stage to maintain equal optical path lengths between the source satellite and the two remote satellites.

Figure 4:
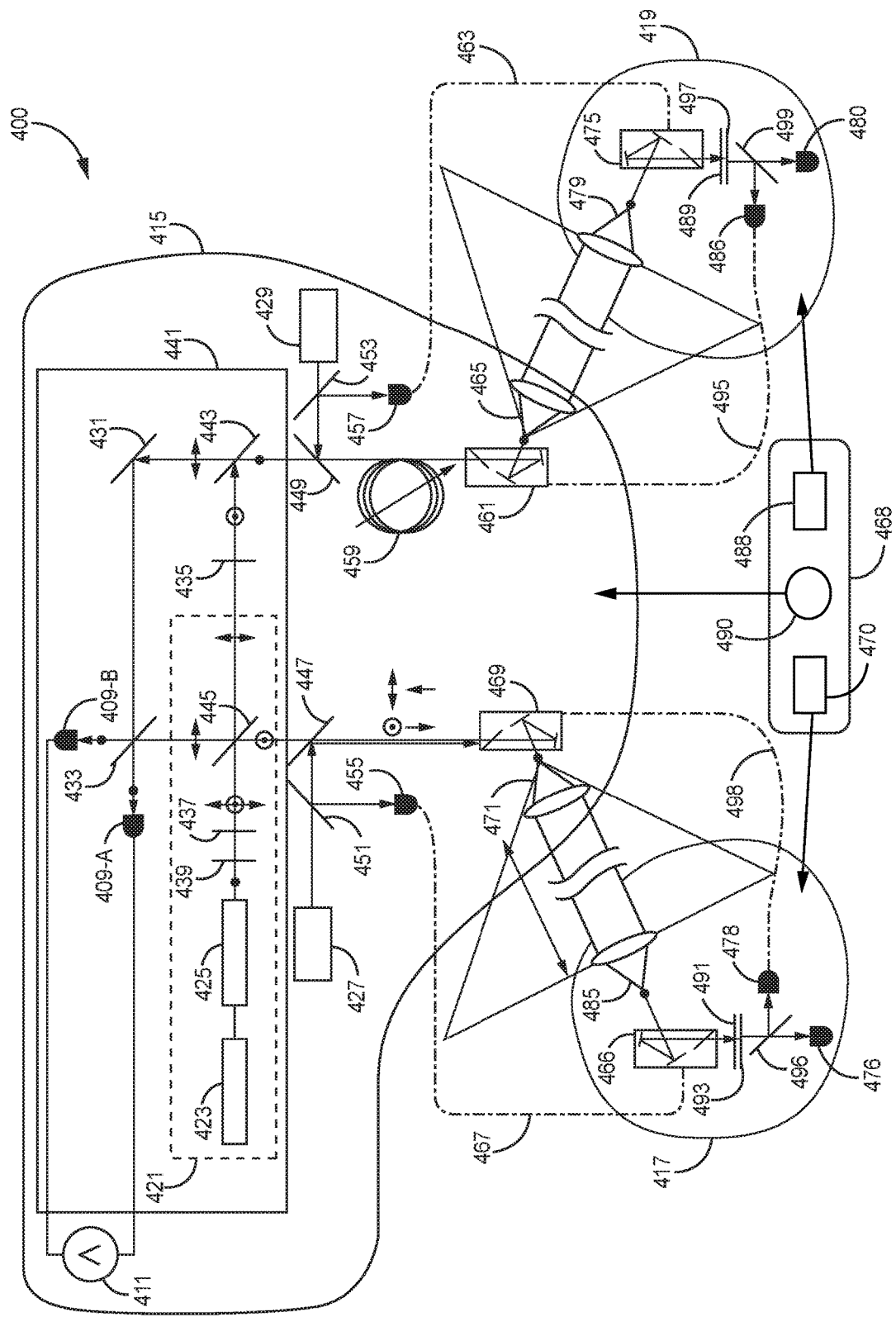
FIG. 4 is a diagram of a system for dynamically locking optical path times between moving bodies using entangled photons according to an aspect of the present disclosure.

FIG. 4 is a diagram of a system 400 for dynamically locking optical path times between moving bodies using entangled photons. As illustrated, the system 400 may include a source satellite 415 in communication with two remote satellites 417 and 419. The source satellite 415 and remote satellites 417 and 419 function in a substantially similar manner as the source satellite 215 and remote satellites 217 and 219 in FIG. 2. As illustrated, the system 400 includes various optical devices used to perform the steps described above for method 300 in FIG. 3.

In certain embodiments, the source satellite 415 may include a bi-photon source and interferometer 441 implemented in discrete optical components useful for transmitting, receiving, and detecting entangled photons. In other embodiments, the source satellite 415 may include a bi-photon source and interferometer 441 implemented in an integrated photonics circuit useful for transmitting, receiving, and detecting entangled photons, such as those described in U.S. Non-Provisional application Ser. No. 16/803,841, filed Feb. 27, 2020, and titled "INTEGRATED PHOTONICS SOURCE AND DETECTOR OF ENTANGLED PHOTONS," which is incorporated herein by reference.

In some embodiments, the bi-photon source and interferometer 441 may include a bi-photon source 421. The bi-photon source 421 may be a laser source that produces time-correlated bi-photon pair states using SPDC, as described above. The bi-photon source and interferometer 441 may further include a non-linear medium 425 (such as a non-linear optical waveguide) for producing bi-photon pair states from a pump photon using SPDC, as described above. In some embodiments, to further condition the bi-photons before transmission to the remote satellites 417 and 419, the bi-photon source 421 may include filters that attenuate light at non-desired frequencies. In the shown example, the bi-photon source 421 may include a low pass filter 439 and a bandpass filter 437. The implemented filtering may depend on the type of light source used for the pump laser 423 and the optical components in the non-linear medium 425, as well as other optical components of the bi-photon source 421. For example, some pump lasers 423 and non-linear mediums 425 may produce bi-photons with a sufficiently narrow spectral content that filtering is unnecessary.

In further embodiments, an optical component may separate the photons in a bi-photon pair according to their polarizations. For example, a polarizing beam splitter 445 may split a free-space bi-photon pair into a free-space vertically polarized photon directed towards a first remote satellite 417, and a free-space horizontally polarized photon directed towards a second remote satellite 419. Alternatively, a waveguide mode splitter may split a guided bi-photon pair into a guided transverse electric (TE) guided mode that then leaves the waveguide as a substantially horizontally polarized free space mode directed towards the first remote satellite 417, and a transverse magnetic (TM) mode which then leaves the waveguide as a substantially vertically polarized free space mode directed to the second remote satellite 419.

Additionally, the polarization of the free-space modes may be modified using bulk optics, including retarder plates and polarizers, to modify the polarization of the free-space modes before they are transmitted to the remote satellites 417 and 419. For example, a bi-photon may pass through a λ/2 waveplate 435, which may rotate a horizontally polarized bi-photon to a vertical polarization. After being rotated by the λ/2 waveplate 435, the bi-photons may be incident on an additional polarizing beam splitter 443, which reflects the vertically polarized bi-photon out of the bi-photon source and interferometer 441 toward the second remote satellite 419.

Concerning the bi-photons coupled out of the bi-photon source and interferometer 441 for transmission to the first remote satellite 417, the bi-photons may be incident on a dichroic mirror 447. As used herein, a dichroic mirror may refer to a mirror that reflects light of a particular wavelength. The bi-photons may have a wavelength that is not reflected by the dichroic mirror 447. For example, the bi-photons may have a wavelength of 810 nm that is not reflected by the dichroic mirror 447.

In addition to the bi-photons coupled out of the bi-photon source and interferometer 441 that are incident on the dichroic mirror 447, a tracer laser source 427 may also produce light that is incident on the dichroic mirror 447. As shown, the tracer laser source 427 may produce a tracer laser beam of a particular polarization that passes through a polarizing beam splitter 451 to be incident on the dichroic mirror 447. In contrast, to the b-photons that pass through the dichroic mirror 447, the tracer laser beam may have a wavelength reflected by the dichroic mirror 447. For example, the wavelength of the tracer laser beam may be 795 nm, where the dichroic mirror 447 reflects light having a wavelength of 795 nm. Further, the tracer laser beam may be substantially brighter than the average brightness of the stream of bi-photons emitted by the bi-photon source and interferometer 441. As the dichroic mirror 447 reflects the tracer laser beam, both the tracer laser beam and the bi-photons may propagate along the same path towards a beam steering device 469.

Similarly, regarding the bi-photons coupled out of the bi-photon source and interferometer 441 for transmission to the second remote satellite 419, the bi-photons may be incident on a dichroic mirror 449 that is similar to the dichroic mirror 447. Accordingly, the bi-photons may have a wavelength that is not reflected by the dichroic mirror 449. Also, an additional tracer laser source 429 may produce light that is incident on the dichroic mirror 449. The tracer laser source 429 may function similarly to the tracer laser source 427. Accordingly, the tracer laser source 429 may produce a tracer laser beam having light of a particular polarization that passes through a polarizing beam splitter 453 to be incident on the dichroic mirror 449. Also, the tracer laser beam may have a wavelength that is reflected by the dichroic mirror 449. As the dichroic mirror 449 reflects the tracer laser beam, both the tracer laser beam and the bi-photons may propagate along the same path towards a beam steering device 461. The optical path between the dichroic mirror 449 and the beam steering device 461 may include one or more adjustable delay elements 459.

In certain embodiments, the beam steering devices 469 and 461 may be a series of adjustable optics that can direct received light towards an expected location of the associated remote satellite. For example, the beam steering device 469 may direct the received light towards an expected location of the first remote satellite 417. The beam steering device 461 may direct the received light towards an expected location of the second remote satellite 419. To transmit the bi-photons and the tracer laser beam to the first remote satellite 417, the beam steering device 469 may provide the bi-photons and the tracer laser beam to a telescope 471, where the telescope 471 emits the light towards the first remote satellite 417. Also, to transmit the bi-photons and the tracer laser beam to the second remote satellite 419, the beam steering device 461 may provide the bi-photons and the tracer laser beam to a telescope 465, where the telescope 465 emits the light towards the second remote satellite 419. The telescopes 471 and 465 may be designed so that the transmitted mode is substantially a fundamental gaussian mode.

In some embodiments, when the first remote satellite 417 receives light from the source satellite 415, the first remote satellite 417 may receive the light through a telescope 485. The telescope 485 may provide the light to a beam steering device 466, where the beam steering device 466 moves to receive light from and transmit light to the source satellite 415. The beam steering device 466 may direct received light from the telescope 485 through a $\lambda/4$ plate 491 to be incident on a partially reflecting mirror 493. The partially reflecting mirror 493 may reflect a portion of the incident light, such as half of the incident light, and allow another portion of the incident light, such as half of the incident light to pass through. The light that passes through the partially reflecting mirror 493 may then be incident on a dichroic mirror 496. The dichroic mirror 496 may reflect the light from the tracer laser beam to a photodetector 478 and allow the bi-photons to pass through the dichroic mirror 496. The bi-photons that pass through the dichroic mirror 496 may be detected by a photodetector 476 (such as a single photon avalanche detector). Alternatively, the dichroic mirror 496 may reflect the bi-photons and allow the light from the tracer laser beam to pass through the dichroic mirror 496.

Similarly, when the second remote satellite 419 receives light from the source satellite 415, the second remote satellite 419 may receive the light through a telescope 479. The telescope 479 may provide the light to a beam steering device 475, where the beam steering device 475 moves to receive light from and transmit light to the source satellite 415. The beam steering device 475 may direct received light from the telescope 479 through a $\lambda/4$ plate 489 to be incident on a partially reflecting mirror 497. The partially reflecting mirror 497 may reflect a portion of the incident light, such as half of the incident light, and allow another portion of the incident light, such as half of the incident light to pass through. The light that passes through the partially reflecting mirror 497 may then be incident on a dichroic mirror 499. The dichroic mirror 499 may reflect the light from the tracer laser beam to a photodetector 486 and allow the bi-photons to pass through the dichroic mirror 499. The bi-photons that pass through the dichroic mirror 499 may be detected by a photodetector 480 (such as a single photon avalanche detector). Alternatively, the dichroic mirror 499 may reflect the bi-photons and allow the light from the tracer laser beam to pass through the dichroic mirror 499.

In certain embodiments, concerning the first remote satellite 417, when the partially reflecting mirror 493 reflects light, the light may pass through the $\lambda/4$ plate 491. The reflected light may pass through the $\lambda/4$ plate 491 twice to change the polarization mode of the light. Thus, if the first remote satellite 417 receives the bi-photons from the source satellite 415 in the horizontally polarized mode, the bi-photons may be rotated into the vertically polarized mode after passing through the $\lambda/4$ plate 491 twice. After passing through the $\lambda/4$ plate 491, the reflected light is guided by the beam steering device 466 for transmission back to the source satellite 415 through the first remote satellite telescope 485 towards the source satellite telescope 471. Similarly, concerning the second remote satellite 419, when the partially reflecting mirror 497 reflects light, the light may pass through the $\lambda/4$ plate 489. After passing through the $\lambda/4$ plate 489, the reflected light is guided by the beam steering device 475 for transmission back to the source satellite 415 through the second remote satellite telescope 479 towards the source satellite telescope 465.

When the source satellite 415 receives the light from the first remote satellite 417, the beam steering device 469 may receive the light through the telescope 471, and the beam steering device 469 may direct the light to the dichroic mirror 447. As the light incident on the dichroic mirror 447 includes components of both the tracer laser beam and the bi-photons, the dichroic mirror 447 may reflect the received tracer laser beam and allow the bi-photons to pass through for coupling back onto the bi-photon source and interferometer 441. The reflected tracer laser beam may then be incident on the polarizing beam splitter 451. As the tracer laser beam twice passed through the λ/4 plate 491 on the first remote satellite 417, the tracer laser beam received from the first remote satellite 417 is now in a second polarization that causes the polarizing beam splitter 451 to reflect the received tracer laser beam. When the polarizing beam splitter 451 reflects the received tracer laser beam, the received tracer laser beam may be detected by a photodetector 455.

Similarly, when the source satellite 415 receives the light from the second remote satellite 419, the beam steering device 461 may receive the light through the telescope 465, and the beam steering device 461 may direct the light to the dichroic mirror 449. The dichroic mirror 449 may reflect the received tracer laser beam and allow the bi-photons to pass through for coupling back onto the bi-photon source and interferometer 441. The reflected tracer laser beam may then be incident on the polarizing beam splitter 453, which reflects the received tracer laser beam towards a photodetector 457.

In some embodiments, when the bi-photon source and interferometer 441 receives the reflected bi-photons from the first remote satellite 417, the received bi-photons will be incident on the polarizing beam splitter 445. As the polarization mode of the received bi-photons changed due to twice passing through the λ/4 plate 491, the received bi-photons may pass through the polarizing beam splitter 445. Similarly, the bi-photons, received from the second remote satellite 419, may also pass through the polarizing beam splitter 443 for reflection off of the mirror 431.

In certain embodiments, reflected bi-photons from both remote satellites 417 and 419 may be incident on the mode combiner 433. For instance, the mode combiner 433 may be a polarization-insensitive 50:50 beam splitter. The output ports of the mode combiner 433 may be directed onto photodetector 409-*a* and photodetector 409-*b*. Both the photodetectors 409-*a* and 409-*b* may be single photon avalanche detectors. The photodetectors 409-*a* and 409-*b* may provide electrical signals to timing and coincidence module 411 that observes the rate of simultaneous arrival of signals from the photodetectors 409-*a* and 409-*b*. When corresponding bi-photons, reflected from the remote satellites 417 and 419, are incident at the mode combiner 433 at substantially the same time, in substantially the same spatial mode, and in substantially the same polarization mode, the bi-photons may quantum-mechanically interfere in the manner of a HOM interferometer. Accordingly, when the bi-photons recombine at the mode combiner 433, the timing and coincidence module 411 may output a signal indicating a HOM dip when the total optical path lengths traveled by the bi-photons are substantially equal.

In certain embodiments, initially, the telescope 471 may not be pointed at the telescope 485, and the telescope 465 may not be pointed at the telescope 479. Accordingly, the source satellite 415 and the remote satellites 417 and 419 may perform mutual optical system pointing. In particular, the source satellite 415 may use the tracer laser beams to point the telescopes 485 and 465 at the respective remote satellites 417 and 419. To further facilitate the pointing of the telescopes 485 and 465 towards the respective telescopes 485 and 479, the source satellite 415 may form one or more communication links with each of the remote satellites 417 and 419. For example, using the communication link 498, the first remote satellite 417 may send information about light detected by the photodetector 478 to the source satellite 415.

Additionally, the source satellite 415 may send information about light detected by the photodetector 455 on the source satellite 415 through the communication link 467. Similarly, the source satellite 415 may send information about light detected by the photodetector 457 to the second remote satellite 419 through the communication link 463 and receive information about light detected by the photodetector 486 on the second remote satellite 419 through the communication link 495. In some implementations, the communication links 498 and 467 may be a single communication link. Also, the communication links 463 and 495 may be a single communication link. The source satellite 415 and remote satellites 417 and 419 may communicate through the communication links 463, 467, 495, and 498 using communication formats, standards, and technologies suitable for inter-satellite communication.

In some embodiments, the source satellite 415 and remote satellites 417 and 419 may transmit information regarding the intensity of the received tracer laser beam through the communication links 463, 467, 495, and 498. A processor may use the transmitted information to control the direction and focus of light emitted from and received by the source satellite 415. Initially, the source satellite 415 may transmit the tracer laser beam as a defocused tracer laser beam that is incident on a large coverage area. The source satellite 415 may change the direction of the defocused tracer laser beam until a portion of the emitted defocused tracer laser beam is incident on the photodetector 478. When a portion of the emitted defocused tracer laser beam is incident on the photodetector 478, the first remote satellite 417 may send a signal back to the source satellite 415.

When the source satellite 415 receives a signal from the first remote satellite 417, indicating that a portion of the tracer laser beam was received by the first remote satellite 417, the source satellite 415 may identify the coverage area of the defocused tracer laser beam, focus the tracer laser beam by an incremental amount, and scan the previously identified coverage area with the incrementally focused tracer laser beam. When the incrementally focused tracer laser beam is incident on the first remote satellite 417, the first remote satellite 417 may indicate that the incrementally focused tracer laser beam was received. Upon reception of the indication, the source satellite 415 may repeat the incremental focusing of the tracer laser beam and search for the first remote satellite 417. The source satellite 415 and first remote satellite 417 repeat incremental focusing of the tracer laser beam until the source satellite 415 transmits the tracer laser beam to the first remote satellite 417 as a narrowly focused collimated beam of light.

In some embodiments, the first remote satellite 417 may reflect a portion of the received tracer laser beam to the source satellite 415. When the reflected portion of the received tracer laser beam is incident on the photodetector 455, the source satellite 415 may transmit a signal to the first remote satellite 417 that indicates that the reflected tracer beam was received by the source satellite 415. The first remote satellite 417 may also adjust the focus and direction of the transmission of the reflected tracer laser beam back to the source satellite 415. In alternative embodiments, the first remote satellite 417 may not transmit a reflected portion of the tracer laser beam back to the source satellite 415.

Similarly, the source satellite 415 may transmit another defocused tracer laser beam towards the second remote satellite 419. Also, the source satellite 415 may change the direction of the defocused tracer laser beam until a portion of the emitted defocused tracer laser beam is incident on the photodetector 486. When a portion of the emitted defocused tracer laser beam is incident on the photodetector 486, the second remote satellite 419 may transmit a signal back to the source satellite 415 through the communication link 495. Also, the source satellite 415 may incrementally focus the tracer laser beam and perform a search for the second remote satellite 419 within incrementally smaller coverage areas until the source satellite 415 transmits the tracer laser beam as a narrowly focused collimated beam of light. Also, the second remote satellite 419 may adjust the transmission of reflected portions of the tracer laser beam towards the source satellite 415 similarly as described above concerning the first remote satellite 417.

In some embodiments, when the tracer laser beams are pointed towards the associated remote satellites 417 and 419, the source satellite 415 may communicate with a ground system 468 through a communication link 490. Additionally, the remote satellites 417 and 419 may also be in communication with the ground system 468 through respective communication links 470 and 488. The ground system 468 may calculate telemetry information for the source satellite 415 and remote satellites 417 and 419 and transmit the telemetry information to the source satellite 415 and the remote satellites 417 and 419. Upon reception of the telemetry information, one or more of the source satellite 415 and the remote satellites 417 and 419 may perform a rough adjustment by inserting a rough-delay element (such as the delay element 459) to reduce the path length difference between the optical paths between the source satellite 415 and the remote satellites 419.

In certain embodiments, a processor may control the focus and direction of transmission of the tracer laser beam, make calculations of path length differences, and direct the insertion of delays into the different optical paths. The processor and/or other computational devices used on the source satellite 415, remote satellites 417 and 419, or other systems and methods described herein may be implemented using software, firmware, hardware, or appropriate combination thereof. The processor and other computational devices may be supplemented by, or incorporated in, specially-designed application-specific integrated circuits (ASICs) or field programmable gate arrays (FPGAs). The processor and other computational devices can also include or function with software programs, firmware, or other computer-readable instructions for carrying out various process tasks, calculations, and control functions used in the methods and systems described herein.

The methods described herein may be implemented or controlled by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein may be implemented in software, firmware, or other computer-readable instructions. These instructions are typically stored on appropriate computer program products that include computer-readable media used to store computer-readable instructions or data structures. Such a computer-readable medium may be available media that can be accessed by a general purpose or special purpose computer or processor or any programmable logic device.

Suitable computer-readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer-executable instructions or data structures.

Figure 5:
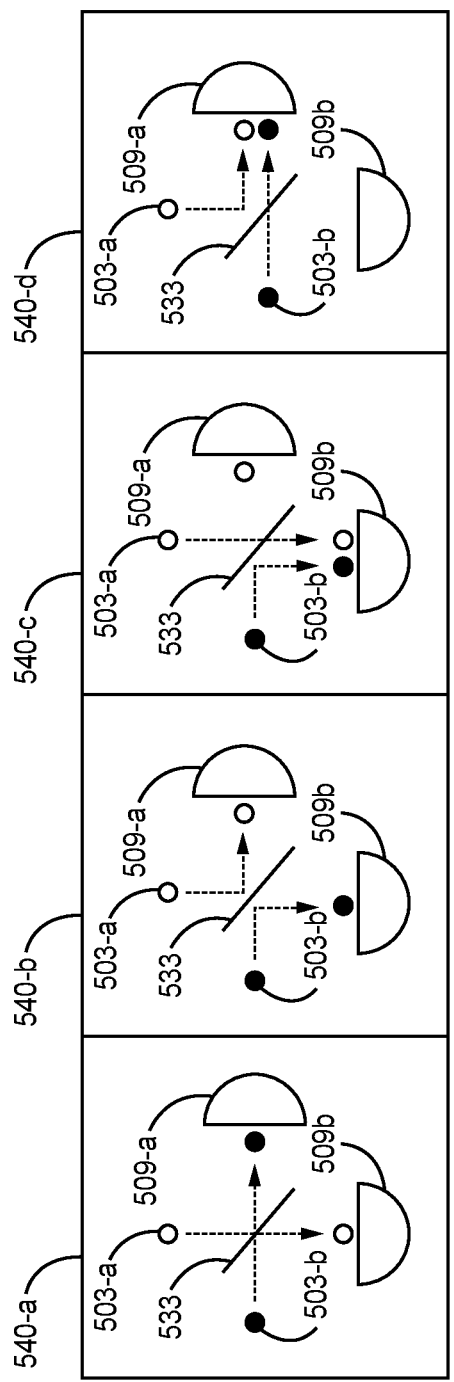
FIG. 5 is a diagram illustrating different optical paths for the reception of photon pairs according to an aspect of the present disclosure.

In certain embodiments, the processor may process information from the photodetectors 409-*a* and 409-*b*. FIG. 5 is a diagram illustrating various combinations 540-*a*-540-*b* in which bi-photons propagating along paths 503-*a* and 503-*b* may be detected by photodetectors 509-*a* and 509-*b*. Some systems may include a 50:50 beam splitter 533 (that functions similarly to the mode combiner 433 in FIG. 4). The 50:50 beam splitter 533 may direct bi-photons received along the optical paths 503-*a* and 503-*b* towards one of two photodetectors 509-*a* and 509-*b*. In some embodiments, a first photon in a pair of bi-photons may be described as a signal photon that propagates along a first optical path 503-*a*, and the second photon in the pair of bi-photons may be described as an idler photon that propagates along a second optical path 503-*b*. The first optical path 503-*a* may be traveled by a signal photon reflected from a first remote reflector, such as a remote satellite with retro reflection optics. The second optical path 503-*b* may be traveled by an idler photon reflected from a second remote reflector. Both the signal photon and the idler photon are thus combined on the 50:50 beam splitter 533. As described above, a timing module may receive signals from two photodetectors 509-*a* and 509-*b*. In some implementations, the photodetectors 509-*a* and 509-*b* may be single photon avalanche photodetectors; however, other types of photodetectors may be used. The photodetectors 509-*a* and 509-*b* may provide electrical signals that are analyzed by a time delay analyzer and coincidence counter in the timing module.

At times, the first optical path 503-*a* of the signal photon may be shorter than the second optical path 503-*b* of the idler photon. Accordingly, the signal photon's flight time may be shorter than the flight time of the idler photon. At other times, the second optical path 503-*b* of the idler photon may be shorter than the first optical path 503-*a* of the signal photon. Accordingly, the idler photon's flight time may be shorter than the flight time of the signal photon. When a flight time is shorter, the associated photon may be incident on one of the photodetectors 509-*a* and 509-*b* before the other photon is incident on one of the photodetectors 509-*a* and 509-*b*. For example, when the signal photon's flight time is shorter than the flight time of the idler photon, the signal photon will be incident on one of the photodetectors 509-*a* and 509-*b* before the idler photon is incident on one of the photodetectors 509-*a* and 509-*b*. Conversely, when the idler photon's flight time is shorter than the flight time of the signal photon, the idler photon will be incident before the signal photon.

When a signal photon is incident on one of the photodetectors 509-*a* and 509-*b*, the signal photon may randomly be incident on one of the photodetectors 509-*a* and 509-*b*. Similarly, when an idler photon is incident on one of the photodetectors 509-*a* and 509-*b*, the idler photon may randomly be incident on one of the photodetectors 509-*a* and 509-*b*. Accordingly, an associated signal photon and idler photon may be incident upon the photodetectors 509-*a* and 509-*b* in one of the combinations 540-*a*-540-*d*. As the signal photon and the idler photon are randomly incident on one of the photodetectors 509-*a* and 509-*b*, each of the combinations 540-*a*-540-*d* may have a substantially 25% chance of occurring.

In combination 540-*a*, the signal photon and the idler photon both pass through the beam splitter 533 and are incident on different photodetectors 509-*a* and 509-*b*. Specifically, the signal photon may pass through the beam splitter 533 and be incident upon the second photodetector 509-*b* at a second photodetector detection time. The idler photon may pass through the beam splitter 533 and be incident upon the first photodetector 509-*a* at a first photodetector detection time. The photodetectors 509-*a* and 509-*b* may provide their signals to a timing module. The timing module may calculate a time difference that is equal to the first photodetector detection time minus the second photodetector detection time.

In combination 540-*b*, the signal photon and the idler photon may both reflect off of the beam splitter 533 and become incident on different photodetectors 509-*a* and 509-*b*. Specifically, the signal photon may reflect off the beam splitter 533 and be incident upon the first photodetector 509-*a* at a first photodetector detection time. The idler photon may reflect off the beam splitter 533 and be incident upon the second photodetector 509-*b* at a second photodetector detection time. The photodetectors 509-*a* and 509-*b* may provide their signals to a processor, where the signals contain information describing the first photodetector detection time and the second photodetector detection time. The processor may calculate a time difference equal to the first photodetector detection time minus the second photodetector time.

In combinations 540-*c* and 540-*d*, the signal photon and the idler photon may be incident on the same photodetector. For example, in combination 540-*c*, the signal photon may pass through the beam splitter 533, and the idler photon may reflect off the beam splitter 533. Accordingly, both the signal photon and the idler photon are incident on the second photodetector 509-*b*. Alternatively, in combination 540-*d*, the signal photon may reflect off the beam splitter 533, and the idler photon may pass through the beam splitter 533. Accordingly, both the signal photon and the idler photon are incident on the first photodetector 509-*a*. When the signal photon and the idler photon are incident on the same photodetector, the photodetectors 509-*a* and 509-*b* do not provide timing information to the processor.

As described above, when the signal photon and the idler photon arrive at different times, the combination 540-*a* may cause the timing module to measure the arrival time of the idler photon minus the arrival time of the signal photon. Also, the combination 540-*b* may cause the timing module to measure the arrival time of the signal photon minus the arrival time of the idler photon. The timing module may not compute a time difference of arrival for two photons incident on the same photodetector as in combinations 540-*c* and 540-*d*. Accordingly, the measurements of the timing module may produce two clusters of results that are substantially equal in magnitude but opposite in sign. The processor may use the measurements to calculate a residual delay coarsely equal to the path length difference between the optical paths 503-*a* or 503-*b*.

Figure 6:
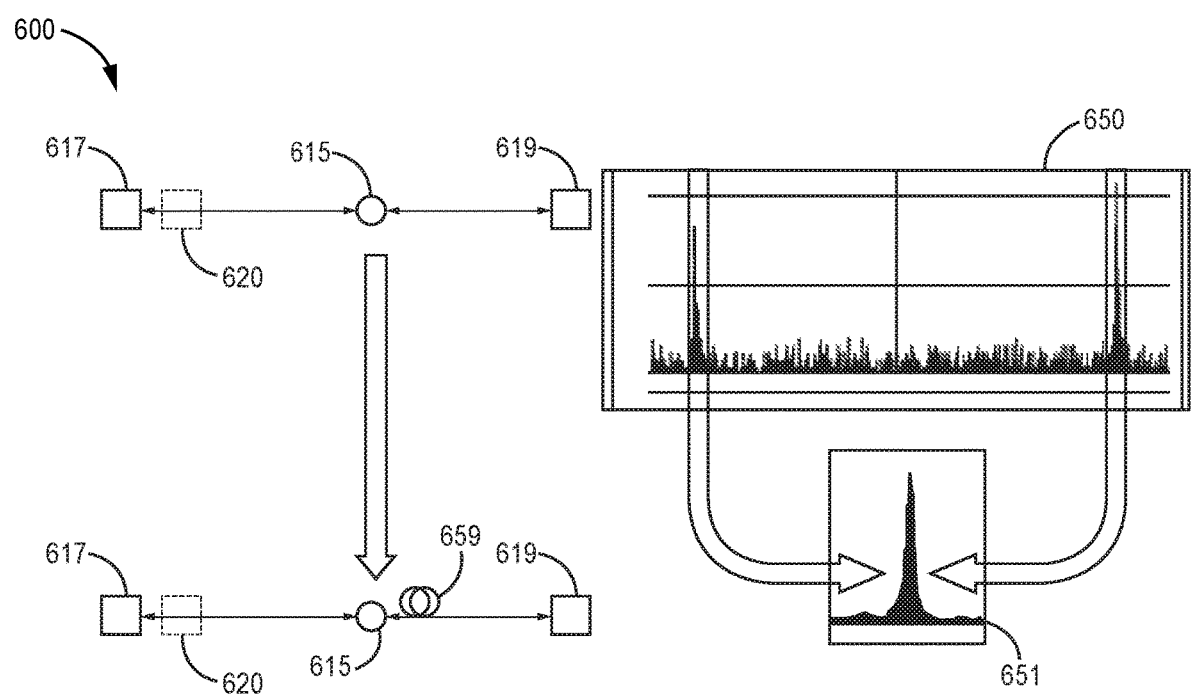
FIG. 6 is a diagram illustrating a system for performing coarse delays to optical paths according to an aspect of the present disclosure.

FIG. 6 is a block diagram of a system 600 that performs a coarse delay adjustment based on the measured residual delay. As described above, the timing module may produce two clusters of results for the time differences of the bi-photons measured at the different photodetectors. The processor may perform a statistical analysis of the recorded time differences. For example, a graph 650 is a histogram of the time differences measured by the timing module based on photons' arrival times at the photodetectors. The graph 650 shows two clusters of measurements that are substantially symmetric about the time of simultaneous arrival of the bi-photons. A processor may perform a double peak fit or other mathematical processes to extract a time delay from the histogram based on half the distance between the identified clusters. The processor may use the extracted information to implement one or more adjustments to remove the time delay between the different optical paths of the bi-photons. The resultant histogram may have a single cluster at the time of substantially simultaneous arrival of the bi-photons, as shown in graph 651.

In certain embodiments, to implement the adjustment, the system 600 includes a photon source 615 (such as a source satellite or other source object) that provides bi-photons to remote reflectors 617 and 619 (such as remote satellites or other remote reflecting objects). Specifically, the photon source 615 may provide a first photon to the first remote reflector 617 and a second photon to the second remote reflector 619. As shown, some unknown path length difference 620 may exist on the optical path of the first photon between the photon source 615 and the first remote reflector 617. Due to the path length difference 620, the timing module may measure a difference in the times that the first photon and the second photon are incident upon the photodetectors. Accordingly, the processor may observe two clusters of measurements that are substantially symmetric about a time of simultaneous arrival.

Additionally, the processor may then extract the time delay from the measurements acquired from the timing module. For example, the width between the clusters of measurements may be equal to twice the delay that results from the path length difference 620. The processor may then add a delay element 659 to the shorter of the optical paths, such that the different optical paths between the photon source 615 and the remote reflectors 617 and 619 are coarsely equal. In some embodiments, the paths are coarsely equal when the path length difference after the added delay element 659 is within the adjustment range of a fine adjuster, such as changes in path length that are performable using optics controlled by a mechanical translation stage.

In some embodiments, the processor may be able to calculate the magnitude of the delay but not the sign of the delay from the acquired measurements. To determine the sign of the delay (identifying which optical path should be delayed by the added delay element 659), the processor may control the addition of the delay element 659 to one of the two optical paths between the photon source 615 and the two remote reflectors 617 and 619. After the addition of the delay element 659 to one of the paths, the processor may again determine if the timing module measures a difference in the time that photons are incident on the photodetectors. If the measurements result in two clusters of measurements that are separated by twice the original delay that existed in the optical path before the addition of the delay element 659, the processor may determine that the delay element 659 was added to the wrong optical path. Accordingly, the processor may then control the addition of the delay element 659 to the other optical path, such that the histogram of the results of the time differences measured by the timing module has a single cluster at the time of simultaneous arrival of the bi-photons as shown in graph 651. Alternatively, if the measurements result in a single cluster of measurements at a simultaneous arrival time, the processor may determine that the delay element 659 was added to the correct optical path.

In further embodiments, the system 600 may add the delay element 659 as a series of discrete optical path lengths of optical transmission media. For example, the system 600 may be capable of inserting a large delay element 659 into one or both of the optical paths. The system 600 may insert the delay element 659 using discrete optical delay elements of various lengths. For example, the delay element 659 may be any combination of optical fiber, mirrors, or other optical devices. The delay element 659 may include insertable optical fiber sections with lengths of 100 m, 10 m, 1 m, 1 cm, and so forth. Also, the delay element 659 may include adjustable mirrors that can reflect light between the mirrors a desired number of times to delay light propagating therebetween as determined by the angle of the mirrors, where the processor controls the angle of the mirrors relative to one another. The system 600 may use other delay elements to control the length of the delay element 659, such as mechanical translation stages, adjustable prisms, and the like. As such, using various lengths of delay, the processor may remove the path length difference between the multiple optical paths such that the path length difference is within an adjustable range of a mechanical translation stage.

In certain embodiments, when the photon source 615 is moving relative to one or both of the remote reflectors 617 and 619, the processor may make adjustments to the delay element 659 to keep the optical path lengths substantially equal. For example, if the processor determines that there is more than one cluster of measurements, the processor may adjust the length of the delay element 659. Alternatively, the processor may adjust the delay element 659 when the processor determines that the difference in the optical path length is greater than an adjustable range of a mechanical translation stage.

Figure 7:
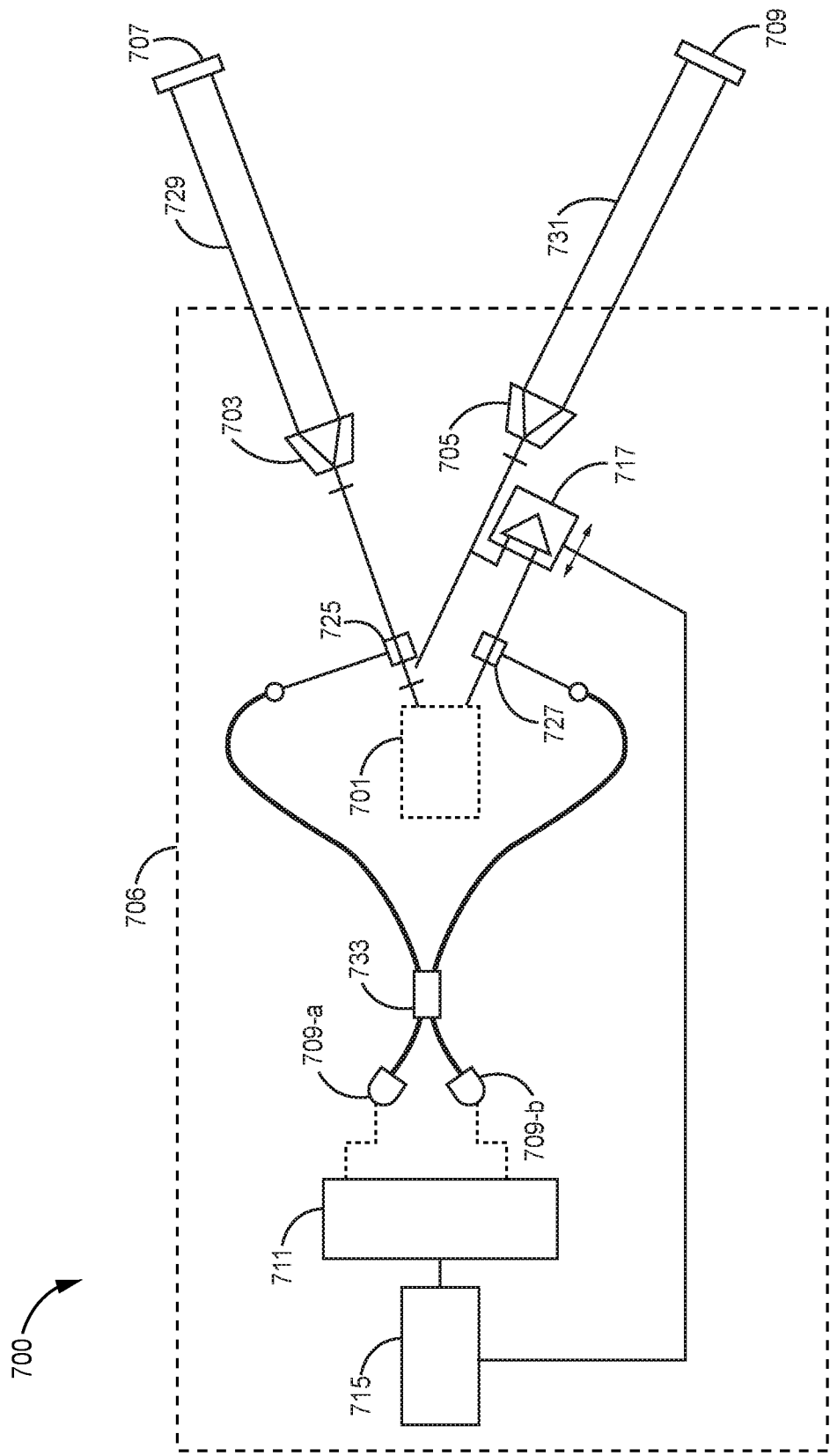
FIG. 7 is a diagram illustrating a system for locking optical path times to a Hong-Ou-Mandel (HOM) dip according to an aspect of the present disclosure.

FIG. 7 is a block diagram of a balancing system 700 that is capable of performing fine adjustments as described above for FIG. 2. As illustrated, the balancing system 700 may include an optical source 706, a remote reflector 707, and a remote reflector 709. The optical source 706 may function similarly as the source satellite 415 described above in FIG. 4. Additionally, the remote reflectors 707 and 709 may function similarly as the remote satellites 417 and 419. For example, the optical source 706 may emit a first bi-photon along a first optical path 729 towards the first remote reflector 707 and emit a second bi-photon along a second optical path towards the second remote reflector 709. The balancing system 700 may adjust the optical path length between a photon source 701 and the remote reflectors 707 and 709 to be substantially equal when the difference between the separate optical path lengths is within an adjustment range of a piezo translation stage.

In certain embodiments, the photon source 701 may emit bi-photons along different optical paths 729 and 731 towards a first emitter/receiver 703 and a second emitter/receiver 705. Accordingly, the first emitter/receiver 703 may emit the first bi-photon towards the first remote reflector 707, after which the first remote reflector 707 reflects the first bi-photon towards the first emitter/receiver 703. Similarly, the second emitter/receiver 705 may emit the second bi-photon towards the second remote reflector 709, after which the remote reflector 709 reflects the second bi-photon towards the second emitter/receiver 705.

In some embodiments, the first emitter/receiver 703 and the second emitter/receiver 705 may provide the received bi-photons to a mode combiner 733. As shown, the first emitter/receiver 703 may receive the first bi-photon from the remote reflector 707 and couple the received first bi-photon into an optical transmission medium, such as a waveguide or an optical fiber. Similarly, the second emitter/receiver 705 may receive the second bi-photon from the remote reflector 709 and couple the second bi-photon into a similar optical transmission medium. The respective optical transmission mediums may connect the photon source 701 to the first emitter/receiver 703 and the second emitter/receiver 705. When the emitter/receivers 703 and 705 transmit the received bi-photons back towards the photon source 701, polarizing beam splitters 725 and 727 (or other coupling devices) may couple the received bi-photons toward the mode combiner 733. The mode combiner 733 may combine the first and second bi-photon modes, and provide output ports to photodetectors 709-a and 709-b. For example, a polarizing beam splitter 725 may receive the first bi-photon from the first emitter/receiver 703 and couple the first bi-photon out of the optical path between the photon source 701 and the first emitter/receiver 703 for coupling into the mode combiner 733. Additionally, a polarizing beam splitter 727 may receive the second bi-photon from the second emitter/receiver 705 and couple the second bi-photon out of the optical path between the photon source 701 and the second emitter/receiver 705 for coupling into the mode combiner 733. As described above for FIG. 5, the photodetectors 709-a and 709-b may provide electrical signals to a timing module 711. The timing module 711 may provide time differences of arrival to a processor 715 for further analyses, as described above.

When the balancing system 700 interferes bi-photons in an interferometer, the processor 715 may measure the degree of interference by processing the information on coincident detections of photons at photodetectors 709-a and 709-b. For example, the processor 715 may compute the rate of coincident detections of photons by the photodetectors 709-a and 709-b to determine whether or not the optical paths are substantially similar to one another. For example, the processor 715 may monitor the received information for a HOM dip that indicates substantially equal optical path lengths.

In some embodiments, the processor 715 may control fine adjustments to the lengths of the optical paths 729 and 731 between the photon source 701 and the remote reflectors 707 and 709. To control the optical path lengths, the processor 715 may control a delay element 717 in one of the optical paths. For example, the second optical path 731 may include a delay element 717 to increase the travel time of the second bi-photon. Alternatively, the delay element 717 may be on the first optical path 729 of the first bi-photon. Further, the processor 715 may control separate delay elements on both optical paths between the photon source 701 and the remote reflectors 707 and 709. In controlling the delay element 717, the processor 715 may send signals to the delay element 717 that cause an actuator in the delay element 717 to change or maintain an optical path through the delay element 717.

In certain embodiments, the delay element 717 may be a mechanical translation stage. For example, the processor 715 may send an electrical signal to a mechanical translation stage, where the mechanical translation stage changes the positions of multiple reflective prisms in relation to one another, such that the optical path length through the prisms changes in response to the electrical signal. For example, if the length of the second optical path 731 is shorter than the length of the first optical path 729, the processor 715 may direct the mechanical translation stage in the delay element 717 to increase the optical path length through the prisms to increase the length of the second optical path 731. If the length of the second optical path 731 is longer than the length of the first optical path 729, the processor 715 may direct the mechanical translation stage to reduce the optical path length through the prisms, thus reducing the length of the second optical path 731. By using a mechanical translation stage and prisms, the processor 715 may alter the length of the second optical path 731 over a continuous range of distances. Alternatively, the delay element 717 may afford discrete adjustments to the optical path length. For example, the delay element 717 may insert lengths of optical fiber into an optical path, expand piezoelectric transducers wound with optical fiber, change mirror angles to control the number of light reflections between two mirrors, tilt the angle of incidence of light upon one or more transparent plates, or any combination of the above.

In some embodiments, the processor 715 sends control signals to the delay element 717 to cause the coincidence rate of the detected bi-photons to dip within the HOM dip, indicating that the bi-photons are substantially interfering within the interferometer. Initially, to adjust the optical path length to move the coincidence rate into the HOM dip, the processor 715 may assume that the optical path lengths for the bi-photons are not equal. Additionally, the processor 715 may initialize the position of the delay element 717 to increase the available range of adjustments to the optical path length. When initialized, the processor 715 may measure the initial coincidence rate detected by the processor 715 of the interferometer. After measuring the initial coincidence rate, the processor 715 may direct the delay element 717 to gradually increase the length of the second optical path 731 until the processor 715 measures a threshold coincidence rate (e.g., fifty percent of the initially measured coincidence rate). When the measured coincidence dips below the threshold coincidence rate, the processor 715 may determine that the optical path lengths for the bi-photons are substantially equal.

Alternatively, the processor 715 may initialize the position of the delay element 717 to enable decreasing the length of the second optical path 731. For example, the processor 715 may direct the delay element 717 to decrease the length of the second optical path 731 until the measured coincidence rate is substantially equal to a threshold coincidence rate. In alternative embodiments, the processor 715 may direct the delay element 717 to gradually increase or decrease the optical path length to identify the smallest acquired measurement of the coincidence rate within the HOM dip.

In some embodiments, when the processor 715 determines that the optical path lengths are substantially equal as described above, the processor 715 may monitor the measured coincidence rate and send electrical signals to the delay element 717 to maintain substantially equal optical path lengths. For example, when the delay element 717 initially increases the length of the second optical path 731 to observe the threshold fraction, if the measured coincidence rate decreases, the processor 715 may determine that the length of the second optical path 731 is increasing. Accordingly, the processor 715 may direct the delay element 717 to decrease the length of the second optical path 731 to maintain the measured coincidence rate at the threshold fraction. Conversely, if the measured coincidence rate increases, the processor 715 may determine that the length of the second optical path 731 is decreasing. Accordingly, the processor 715 may direct the delay element 717 to increase the length of the second optical path 731 so that the measured coincidence rate decreases toward the threshold fraction.

In an alternative embodiment, when the delay element 717 initially decreased the length of the second optical path 731 to observe the threshold fraction, if the measured coincidence rate decreases, the processor 715 may determine that the length of the second optical path 731 is decreasing. Accordingly, the processor 715 may direct the delay element 717 to increase the length of the second optical path 731 to maintain the measured coincidence rate at the threshold fraction. Conversely, if the measured coincidence rate increases, the processor 715 may determine that the length of the second optical path 731 is increasing. Accordingly, the processor 715 may direct the delay element 717 to decrease the length of the second optical path 731 to maintain the measured coincidence rate at the threshold fraction.

Figure 8:
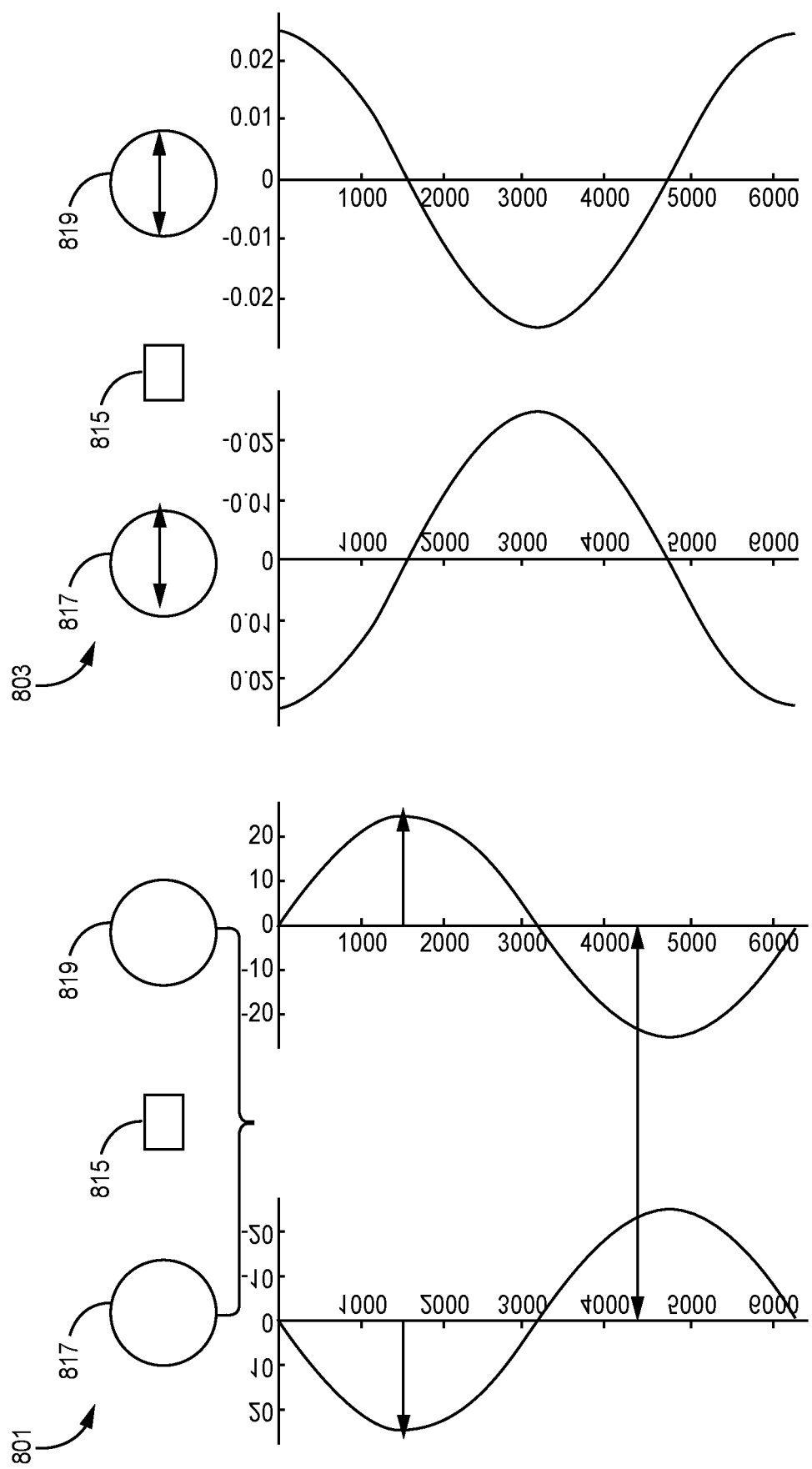
FIG. 8 illustrates graphs showing optical path oscillations according to an aspect of the present disclosure.

FIG. 8 provides two graphs illustrating changes in position and velocity for remote satellites 817 and 819 about a source satellite 815. The graph 801 illustrates the change in position of the remote satellites 817 and 819 about the source satellite 815, and graph 803 illustrates the change in velocity of the remote satellites 817 and 819 about the source satellite 815. In the embodiment shown, the position and velocity of the remote satellites 817 and 819 may experience periodic variations. For example, the periodic variations may include sinusoidal variations of position and velocity relative to the source satellite 815.

Processors in one or more of the source satellite 815 and remote satellites 817 and 819 may use information concerning the changes in velocity and position to more efficiently maintain equal optical path lengths between the source satellite 815 and the remote satellites 817 and 819. For example, the source satellite 815 may change the optical path length when the velocity is near zero, and the relative position of the satellites is slowly changing. Also, the processors may use the information concerning the changes in velocity and position to make continuous changes to the length of the optical paths that track the sinusoidal changes in relative position.

Figure 9:
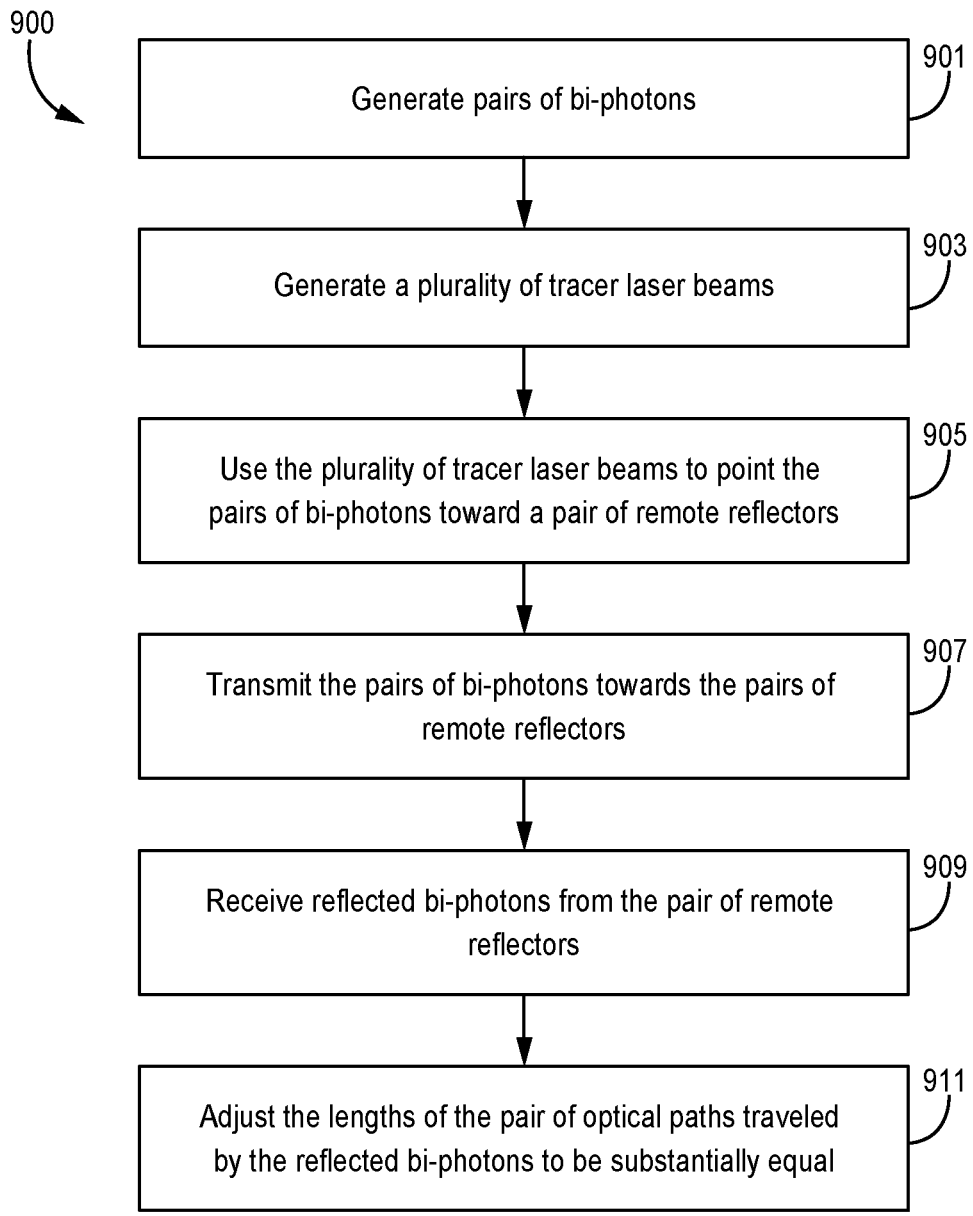
FIG. 9 is a flowchart diagram illustrating a method for dynamically locking optical path times using entangled photons according to an aspect of the present disclosure.

FIG. 9 is a flowchart diagram of a method 900 for performing dynamic locking of optical path times using entangled photons. The method 900 proceeds at 901, where pairs of bi-photons are generated. Also, the method 900 proceeds at 903, where a plurality of tracer laser beams is generated. The method 900 further proceeds at 905, where the plurality of tracer laser beams is used to point the pairs of bi-photons toward a pair of remote reflectors.

In certain embodiments, the method 900 proceeds at 907, where the pairs of bi-photons are transmitted towards the pairs of remote reflectors. Additionally, the method 900 proceeds at 909, where the reflected bi-photons are received from the pair of remote reflectors. Moreover, the method 900 proceeds at 911, where the lengths of the pair of optical paths traveled by the reflected bi-photons are adjusted to be substantially equal.

Example Embodiments

Example 1 includes a system comprising: an optical source for generating pairs of bi-photons; a plurality of tracer laser beam sources for generating a plurality of tracer laser beams; a plurality of telescopes that emit the plurality of tracer laser beams and the pairs of bi-photons to a pair of remote reflectors, each bi-photon in the pairs of bi-photons traveling along an optical path in a pair of optical paths toward a corresponding remote reflector in the pair of remote reflectors, wherein the plurality of telescopes receive reflected bi-photons from the pair of remote reflectors; a plurality of communication links, wherein the optical source communicates with a first remote reflector in the pair of remote reflectors through a first communication link in the plurality of communication links and with a second remote reflector in the pair of remote reflectors through a second communication link in the plurality of communication links; wherein the optical source uses the plurality of tracer laser beams and the plurality of communication links to respectively point the pairs of bi-photons towards the pair of remote reflectors; and an interferometer that provides information regarding detection of the reflected bi-photons, wherein the optical source adjusts lengths of the pair of optical paths to be substantially equal based on the provided information.

Example 2 includes the system of Example 1, wherein the optical source uses a tracer laser beam in the plurality of tracer laser beams to point a bi-photon in the pairs of bi-photons toward a respective remote reflector in the pair of remote reflectors by: defocusing the tracer laser beam, wherein the defocused tracer laser beam is associated with a coverage area; moving a direction of the defocused tracer laser beam until the optical source receives an indication from the respective remote reflector that the respective remote reflector is receiving a portion of the defocused tracer laser beam; and incrementally focusing the tracer laser beam and identifying a location of the respective remote reflector within incrementally smaller coverage areas associated with the incrementally focused tracer laser beam.

Example 3 includes the system of any of Examples 1-2, wherein the plurality of tracer laser beams are brighter than the pair of bi-photons.

Example 4 includes the system of any of Examples 1-3, wherein the plurality of tracer laser beams have a wavelength that is different from the pairs of bi-photons.

Example 5 includes the system of any of Examples 1-4, wherein the optical source: acquires telemetry information for the optical source and the pair of remote reflectors; calculates a difference in the lengths of the pair of optical paths; and inserts a rough delay element into one of the optical paths in the pair of optical paths, wherein the rough delay element is roughly equal to the difference in the lengths.

Example 6 includes the system of Example 5, wherein the optical source and the pair of remote reflectors are satellites, and the optical source acquires the telemetry information from a ground system.

Example 7 includes the system of any of Examples 1-6, further comprising a plurality of photodetectors coupled to the interferometer, wherein the optical source uses the provided information to measure a difference in length between different optical paths in the pair of optical paths based on a time difference between when bi-photons in the pairs of bi-photons are incident on different photodetectors in the plurality of photodetectors.

Example 8 includes the system of Example 7, wherein the optical source: inserts a length of optical transmission media into at least one optical path in the pair of optical paths, wherein the length of optical transmission media is substantially equal to the measured difference in length; measure a changed difference in length between the different optical paths after the length of optical transmission media is inserted into the at least one optical path; determine whether the changed difference in length is greater than the measured difference in length; and when the changed difference in length is greater than the measured difference in length, remove the length of optical transmission media from the at least one optical path and insert the length of optical transmission media into another optical path in the pair of optical paths.

Example 9 includes the system of any of Examples 1-8, wherein the optical source adjusts a length of at least one optical path in the pair of optical paths such that the provided information indicates that the interferometer observes a Hong-Ou-Mandel dip.

Example 10 includes the system of Example 9, wherein the optical source adjusts the length of the at least one optical path using a mechanical translation stage.

Example 11 includes the system of any of Examples 1-10, wherein the optical source adjusts the lengths of at least one optical path in the pair of optical paths to dynamically maintain substantially equal lengths of the pair of optical paths.

Example 12 includes the system of Example 11, wherein the optical source adjusts the lengths of the at least one optical path based on periodic variations in the lengths of the pair of optical paths.

Example 13 includes a method comprising: generating pairs of bi-photons; generating a plurality of tracer laser beams; using the plurality of tracer laser beams to point the pairs of bi-photons toward a pair of remote reflectors; transmitting the pairs of bi-photons towards the pair of remote reflectors, each bi-photon in the pairs of bi-photons traveling along an optical path in a pair of optical paths toward a corresponding remote reflector in the pair of remote reflectors; receiving reflected bi-photons from the pair of remote reflectors; and adjusting lengths of the pair of optical paths based on acquired information from an interferometer, wherein the lengths of the pair of optical paths are adjusted to be substantially equal.

Example 14 includes the method of Example 13, wherein using the plurality of tracer laser beams to point the pairs of bi-photons comprises: defocusing a tracer laser beam in the plurality of tracer laser beams, wherein the defocused tracer laser beam is associated with a coverage area; moving a direction of the defocused tracer laser beam until an indication is received from a respective remote reflector that the respective remote reflector is receiving a portion of the defocused tracer laser beam; and incrementally focusing the tracer laser beam and identifying a location of the remote reflector within incrementally smaller coverage areas associated with the incrementally focused tracer laser beam.

Example 15 includes the method of any of Examples 13-14, further comprising: acquiring telemetry information for an optical source and the pair of remote reflectors; calculating a difference in the lengths of the pair of optical paths; and inserting a rough-delay element into one of the optical paths in the pair of optical paths, wherein the rough-delay element is roughly equal to the difference in the lengths.

Example 16 includes the method of any of Examples 13-15, wherein adjusting the lengths further comprises measuring a difference in length between different optical paths in the pair of optical paths based on a time difference between when bi-photons in the pairs of bi-photons are incident on different photodetectors in a plurality of photodetectors coupled to the interferometer.

Example 17 includes the method of Example 16, further comprising: inserting a length of optical transmission media into at least one optical path in the pair of optical paths, wherein the length of optical transmission media is substantially equal to the measured difference in length; measuring a changed difference in length between the different optical paths after the length of optical transmission media is inserted into the at least one optical path; determining whether the changed difference in length is greater than the measured difference in length; and when the changed difference in length is greater than the measured difference in length, removing the length of optical transmission media from the at least one optical path and inserting the length of optical transmission media into another optical path in the pair of optical paths.

Example 18 includes the method of any of Examples 13-17, wherein adjusting the lengths further comprises adjusting a length of at least one optical path in the pair of optical paths such that the acquired information indicates that the interferometer observes a Hong-Ou-Mandel dip, wherein the length of the at least one optical path is adjusted using a mechanical translation stage.

Example 19 includes the method of any of Examples 13-18, further comprising dynamically maintaining substantially equal lengths of the pair of optical paths.

Example 20 includes a system comprising: a source body having an optical source for generating pairs of bi-photons, each pair in the pairs of bi-photons having a first bi-photon and a second bi-photon; a first tracer laser beam source for generating a first tracer laser beam; a second tracer laser beam source for generating a second tracer laser beam; a first remote body that receives first bi-photons for the pairs of bi-photons along a first optical path and the first tracer laser beam from the source body, wherein the first remote body reflects a first portion of the received first bi-photon to the source body; a second remote body that receives second bi-photons for the pairs of bi-photons along a second optical path and the second tracer laser beam from the source body, wherein the second remote body reflects a second portion of the received second bi-photon to the source body; wherein the source body uses the first tracer laser beam to point the first bi-photons towards the first remote body and the second tracer laser beam to point the second bi-photons towards the second remote body; and an interferometer that provides information regarding detection of the first portion and the second portion, wherein the source body adjusts lengths of the first optical path and the second optical path to be substantially equal based on the provided information.

Although this document describes and illustrates specific embodiments, those of ordinary skill in the art will appreciate that any arrangement, calculated to achieve the same purpose, may be substituted for the specific embodiments shown and described herein. Therefore, it is manifestly intended that this invention be limited only by the claims and the equivalents thereof

What is claimed is:

1. A system comprising:
an optical source for generating pairs of bi-photons;
a plurality of tracer laser beam sources for generating a plurality of tracer laser beams;
a plurality of telescopes that emit the plurality of tracer laser beams and the pairs of bi-photons to a pair of remote reflectors, each bi-photon in the pairs of bi-photons traveling along an optical path in a pair of optical paths toward a corresponding remote reflector in the pair of remote reflectors, wherein the plurality of telescopes receive reflected bi-photons from the pair of remote reflectors;
a plurality of communication links, wherein the optical source communicates with a first remote reflector in the pair of remote reflectors through a first communication link in the plurality of communication links and with a second remote reflector in the pair of remote reflectors through a second communication link in the plurality of communication links;
wherein the optical source uses the plurality of tracer laser beams and the plurality of communication links to respectively point the pairs of bi-photons towards the pair of remote reflectors; and
an interferometer that provides information regarding detection of the reflected bi-photons, wherein the optical source adjusts lengths of the pair of optical paths to be substantially equal based on the provided information.

2. The system of claim 1, wherein the optical source uses a tracer laser beam in the plurality of tracer laser beams to point a bi-photon in the pairs of bi-photons toward a respective remote reflector in the pair of remote reflectors by:
defocusing the tracer laser beam, wherein the defocused tracer laser beam is associated with a coverage area;
moving a direction of the defocused tracer laser beam until the optical source receives an indication from the respective remote reflector that the respective remote reflector is receiving a portion of the defocused tracer laser beam; and
incrementally focusing the tracer laser beam and identifying a location of the respective remote reflector within incrementally smaller coverage areas associated with the incrementally focused tracer laser beam.

3. The system of claim 1, wherein the plurality of tracer laser beams are brighter than the pair of bi-photons.

4. The system of claim 1, wherein the plurality of tracer laser beams have a wavelength that is different from the pairs of bi-photons.

5. The system of claim 1, wherein the optical source:
acquires telemetry information for the optical source and the pair of remote reflectors;
calculates a difference in the lengths of the pair of optical paths; and
inserts a rough delay element into one of the optical paths in the pair of optical paths, wherein the rough delay element is roughly equal to the difference in the lengths.

6. The system of claim 5, wherein the optical source and the pair of remote reflectors are satellites, and the optical source acquires the telemetry information from a ground system.

7. The system of claim 1, further comprising a plurality of photodetectors coupled to the interferometer, wherein the optical source uses the provided information to measure a difference in length between different optical paths in the pair of optical paths based on a time difference between when bi-photons in the pairs of bi-photons are incident on different photodetectors in the plurality of photodetectors.

8. The system of claim 7, wherein the optical source:
inserts a length of optical transmission media into at least one optical path in the pair of optical paths, wherein the length of optical transmission media is substantially equal to the measured difference in length;
measure a changed difference in length between the different optical paths after the length of optical transmission media is inserted into the at least one optical path;
determine whether the changed difference in length is greater than the measured difference in length; and
when the changed difference in length is greater than the measured difference in length, remove the length of optical transmission media from the at least one optical path and insert the length of optical transmission media into another optical path in the pair of optical paths.

9. The system of claim 1, wherein the optical source adjusts a length of at least one optical path in the pair of optical paths such that the provided information indicates that the interferometer observes a Hong-Ou-Mandel dip.

10. The system of claim 9, wherein the optical source adjusts the length of the at least one optical path using a mechanical translation stage.

11. The system of claim 1, wherein the optical source adjusts the lengths of at least one optical path in the pair of optical paths to dynamically maintain substantially equal lengths of the pair of optical paths.

12. The system of claim 11, wherein the optical source adjusts the lengths of the at least one optical path based on periodic variations in the lengths of the pair of optical paths.

13. A method comprising:
generating pairs of bi-photons;
generating a plurality of tracer laser beams;
using the plurality of tracer laser beams to point the pairs of bi-photons toward a pair of remote reflectors;
transmitting the pairs of bi-photons towards the pair of remote reflectors, each bi-photon in the pairs of bi-photons traveling along an optical path in a pair of optical paths toward a corresponding remote reflector in the pair of remote reflectors;
receiving reflected bi-photons from the pair of remote reflectors; and
adjusting lengths of the pair of optical paths based on acquired information from an interferometer, wherein the lengths of the pair of optical paths are adjusted to be substantially equal.

14. The method of claim 13, wherein using the plurality of tracer laser beams to point the pairs of bi-photons comprises:
defocusing a tracer laser beam in the plurality of tracer laser beams, wherein the defocused tracer laser beam is associated with a coverage area;
moving a direction of the defocused tracer laser beam until an indication is received from a respective remote reflector that the respective remote reflector is receiving a portion of the defocused tracer laser beam; and
incrementally focusing the tracer laser beam and identifying a location of the remote reflector within incrementally smaller coverage areas associated with the incrementally focused tracer laser beam.

15. The method of claim 13, further comprising:
acquiring telemetry information for an optical source and the pair of remote reflectors;
calculating a difference in the lengths of the pair of optical paths; and
inserting a rough-delay element into one of the optical paths in the pair of optical paths, wherein the rough-delay element is roughly equal to the difference in the lengths.

16. The method of claim 13, wherein adjusting the lengths further comprises measuring a difference in length between different optical paths in the pair of optical paths based on a time difference between when bi-photons in the pairs of bi-photons are incident on different photodetectors in a plurality of photodetectors coupled to the interferometer.

17. The method of claim 16, further comprising:
inserting a length of optical transmission media into at least one optical path in the pair of optical paths, wherein the length of optical transmission media is substantially equal to the measured difference in length;
measuring a changed difference in length between the different optical paths after the length of optical transmission media is inserted into the at least one optical path;
determining whether the changed difference in length is greater than the measured difference in length; and
when the changed difference in length is greater than the measured difference in length, removing the length of optical transmission media from the at least one optical path and inserting the length of optical transmission media into another optical path in the pair of optical paths.

18. The method of claim 13, wherein adjusting the lengths further comprises adjusting a length of at least one optical path in the pair of optical paths such that the acquired information indicates that the interferometer observes a Hong-Ou-Mandel dip, wherein the length of the at least one optical path is adjusted using a mechanical translation stage.

19. The method of claim 13, further comprising dynamically maintaining substantially equal lengths of the pair of optical paths.

20. A system comprising:
a source body having an optical source for generating pairs of bi-photons, each pair in the pairs of bi-photons having a first bi-photon and a second bi-photon;
a first tracer laser beam source for generating a first tracer laser beam;
a second tracer laser beam source for generating a second tracer laser beam;
a first remote body that receives first bi-photons for the pairs of bi-photons along a first optical path and the first tracer laser beam from the source body, wherein the first remote body reflects a first portion of the received first bi-photon to the source body;
a second remote body that receives second bi-photons for the pairs of bi-photons along a second optical path and the second tracer laser beam from the source body, wherein the second remote body reflects a second portion of the received second bi-photon to the source body;
wherein the source body uses the first tracer laser beam to point the first bi-photons towards the first remote body and the second tracer laser beam to point the second bi-photons towards the second remote body; and
an interferometer that provides information regarding detection of the first portion and the second portion, wherein the source body adjusts lengths of the first optical path and the second optical path to be substantially equal based on the provided information.

* * * * *